United States Patent
Dikmen et al.

(10) Patent No.: US 9,008,457 B2
(45) Date of Patent: Apr. 14, 2015

(54) SYSTEMS AND METHODS FOR ILLUMINATION CORRECTION OF AN IMAGE

(75) Inventors: Mert Dikmen, Champaign, IL (US); Sanjay J. Patel, Urbana, IL (US); Dennis Lin, Urbana, IL (US); Quang H. Nguyen, Ho Chi Minh (VN); Minh N. Do, Urbana, IL (US)

(73) Assignee: Pesonify, Inc., Chicago, IL (US)

( * ) Notice: Subject to any disclaimer, the term of this patent is extended or adjusted under 35 U.S.C. 154(b) by 988 days.

(21) Appl. No.: 13/149,715

(22) Filed: May 31, 2011

(65) Prior Publication Data

US 2011/0293179 A1 Dec. 1, 2011

Related U.S. Application Data

(60) Provisional application No. 61/349,985, filed on May 31, 2010.

(51) Int. Cl.
*G06K 9/00* (2006.01)
*G06T 5/00* (2006.01)

(52) U.S. Cl.
CPC ...................................... *G06T 5/008* (2013.01)

(58) Field of Classification Search
None
See application file for complete search history.

(56) References Cited

U.S. PATENT DOCUMENTS

| | | | | |
|---|---|---|---|---|
| 4,679,068 A * | 7/1987 | Lillquist et al. | | 348/33 |
| 4,967,276 A * | 10/1990 | Murakami et al. | | 348/164 |
| 5,001,558 A * | 3/1991 | Burley et al. | | 348/164 |
| 5,343,311 A * | 8/1994 | Morag et al. | | 358/518 |
| 5,506,946 A * | 4/1996 | Bar et al. | | 345/600 |
| 5,517,334 A * | 5/1996 | Morag et al. | | 358/518 |
| 6,150,930 A * | 11/2000 | Cooper | | 340/435 |
| 6,292,212 B1 * | 9/2001 | Zigadlo et al. | | 348/33 |
| 6,664,973 B1 * | 12/2003 | Iwamoto et al. | | 345/589 |
| 6,798,578 B1 * | 9/2004 | Beystrum et al. | | 359/630 |
| 7,620,265 B1 * | 11/2009 | Wolff et al. | | 382/276 |
| 7,773,136 B2 * | 8/2010 | Ohyama et al. | | 348/276 |
| 8,649,932 B2 * | 2/2014 | Mian et al. | | 250/316.1 |
| 2006/0262363 A1 * | 11/2006 | Henley | | 358/516 |
| 2006/0268110 A1 * | 11/2006 | Koike et al. | | 348/159 |
| 2007/0146512 A1 * | 6/2007 | Suzuki et al. | | 348/272 |
| 2007/0201738 A1 * | 8/2007 | Toda et al. | | 382/144 |
| 2008/0088826 A1 * | 4/2008 | Ohyama et al. | | 356/51 |
| 2008/0111894 A1 * | 5/2008 | Tanimoto | | 348/222.1 |
| 2011/0243430 A1 * | 10/2011 | Hung et al. | | 382/162 |

* cited by examiner

*Primary Examiner* — Jayesh A Patel
(74) *Attorney, Agent, or Firm* — Invention Mine, LLC

(57) ABSTRACT

An RGB color image and an infrared intensity image of a live video are received. The RGB color image is converted to a colorspace image comprising a channel corresponding to a brightness value. Each pixel of the converted colorspace image is evaluated to determine whether the brightness channel of the pixel exceeds a threshold value. If the brightness channel of the pixel exceeds the threshold value, the infrared intensity value of a corresponding pixel from the infrared intensity image is mixed into the pixel's channel value that corresponds to brightness. The converted colorspace image is converted back to an RGB color image.

20 Claims, 13 Drawing Sheets

SYSTEMS AND METHODS FOR ILLUMINATION CORRECTION OF AN IMAGE

RELATED APPLICATION

This application claims the benefit of U.S. Provisional Application No. 61/349,985 filed on May 31, 2010 and entitled "Illumination Correction Using An Infrared Light Source."

BACKGROUND OF THE INVENTION

1. Field of the Invention

The present invention is related to the field of video processing, and more specifically towards systems and methods for illumination correction of an image.

2. Art Background

Conventional video conferencing settings may comprise a camera and various point light sources. For example, the camera may be recording a user while a point light source, such as a spotlight, may create uneven lighting and directional shadows on the user. Since the contrast introduced by the uneven lighting is generally beyond the dynamic range of a display device viewing the camera video, the resulting video or image quality may be degraded. Moreover, the directional shadows may introduce a communication barrier between parties of the video conference as the directional shadows may accentuate the location differences between the parties of the video conference.

Accordingly, it is highly desirable to develop systems and methods for illumination correction of an image. The systems and methods may provide video processing techniques such that an image of a user from a camera may be processed to provide a corrected illumination to deemphasize the uneven lighting and directional shadows on the user.

SUMMARY OF THE INVENTION

The systems and methods disclosed herein correct the illumination of an image. Specifically, the systems and methods may receive a color image and an infrared intensity image. The color image may comprise an RGB image. The RGB image may be converted to a colorspace with a channel that corresponds to a brightness (or light intensity) value for each pixel. For example, the RGB image may be converted to an HSV, CIE-Lab, YUV, or YCrCb colorspace image. Each pixel of the HSV or CIE-Lab colorspace image is compared to a brightness threshold value. For example, the 'V' channel of the HSV colorspace image or the 'L' channel of the CIE-Lab colorspace image may be compared to the brightness threshold value. Depending on the brightness threshold value, a value of each pixel may be modified based on the infrared intensity value of a corresponding pixel of the infrared intensity image. For example, the 'V' channel or 'L' channel of a pixel may be modified based on the infrared intensity value. As such, the infrared intensity image is mixed into the color image.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

The systems, methods, and circuits disclosed herein relate to illumination correction of an image.

In the following detailed description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well known methods, procedures, and systems have not been described in detail to avoid unnecessarily obscuring aspects of the present invention.

Figure 1:
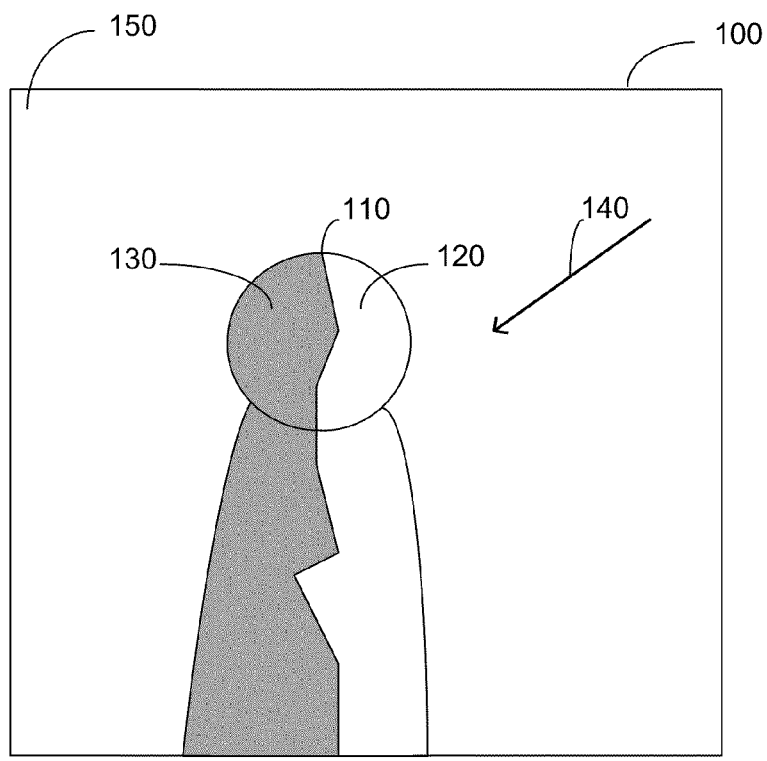
FIG. 1 illustrates an example video or image of a user with a point light source creating uneven lighting and directional shadows in accordance with some embodiments.

FIG. 1 illustrates an example video or image 100 of a user with a point light source creating uneven lighting and directional shadows in accordance with some embodiments. As seen in FIG. 1, the video or image 100 comprises a user 110 and a background 150. Light 140, which may be from a point light source, may be shining onto the user 110. As such, the user 110 comprises a section 120 that is illuminated by the light 140 from the point light source and a section 130 that may comprise portions of the user's body that are not directly illuminated by the light 140 from the point light source. As such, in some embodiments, the light 140 may create uneven light distribution across the user 110 and create a shadow across user section 130.

Figure 2:
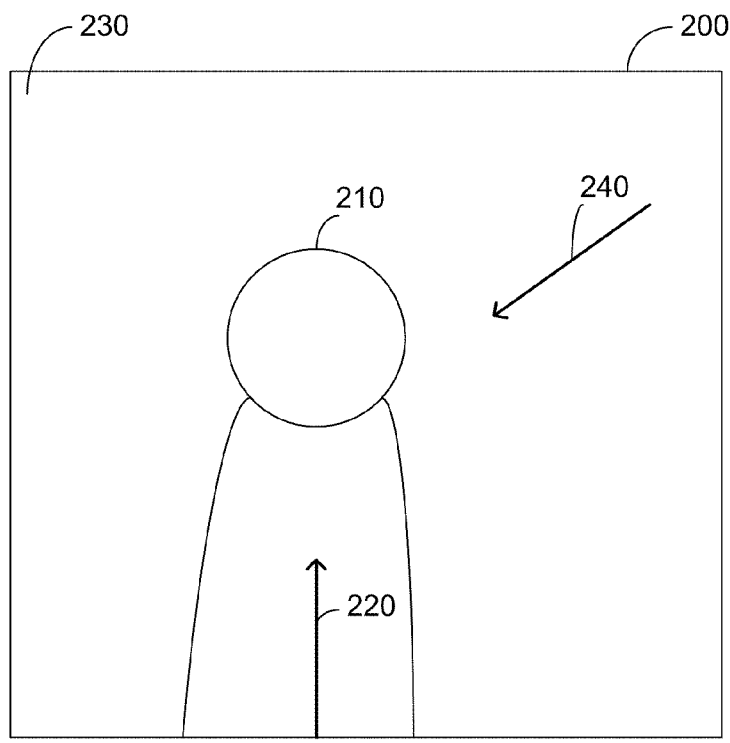
FIG. 2 illustrates an example video or image of a user being illuminated with infrared light for illumination correction.

FIG. 2 illustrates an example video or image 200 of a user being illuminated with infrared light for illumination correction. As seen in FIG. 2, the video 200 may comprise a user 210 and a background 230. An infrared light 220 from an infrared illuminator is provided such that the light comprises a frontal illumination of the user 210. The infrared light 220 is not visible to the user 210 as the infrared light is not within the visible spectrum. As such, even though light 240 from a point light source is shining on the user 210, the user as comprised within the video or image does not have uneven lighting or a shadow across a portion of the user 210.

Figure 3:
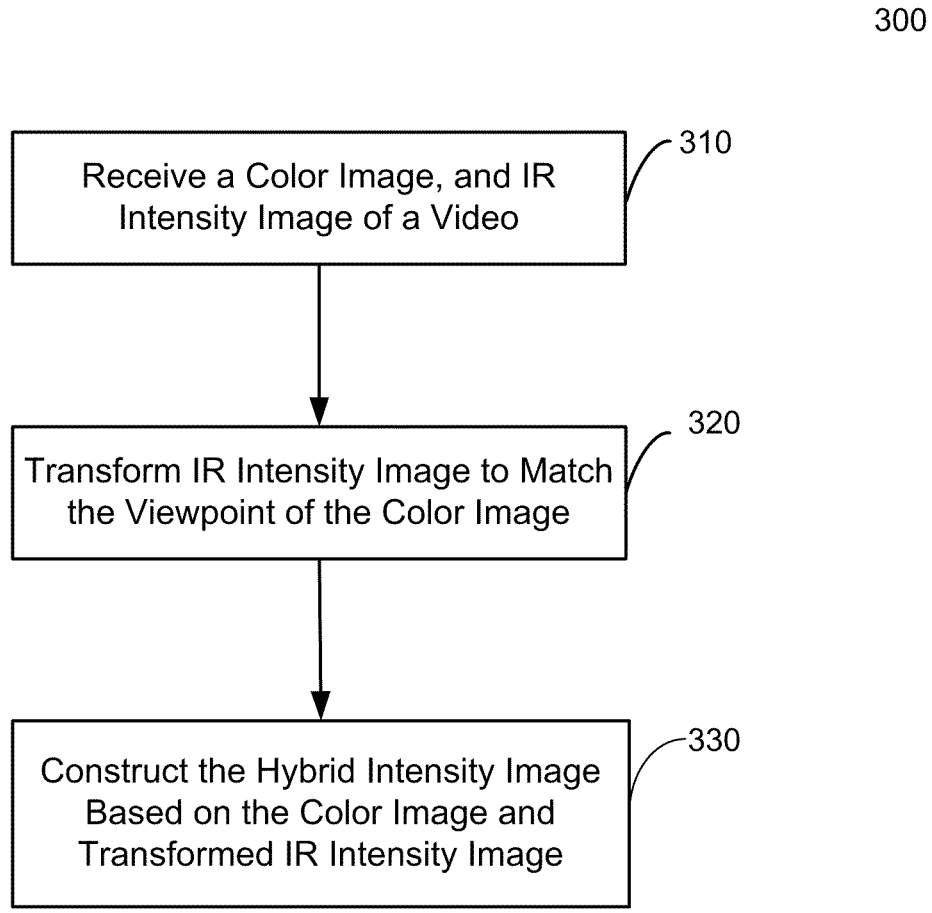
FIG. 3 illustrates a flow diagram of a method for illumination correction of an image in accordance with some embodiments.

FIG. 3 illustrates a flow diagram of a method 300 for illumination correction of an image of a video in accordance with some embodiments. In general, the method 300 receives a color image and an infrared intensity image of a video and constructs a hybrid intensity image.

As seen in FIG. 3, at block 310, a color image and an infrared intensity image of a video is received. In some embodiments, the color image may comprise color pixel information of an image frame of a video and the infrared intensity image may comprise an image of infrared intensity values. In some embodiments, a depth image may also be received. The depth image may comprise the distance of each pixel of an image frame of a video from a sensor. The color image, depth image, and infrared intensity image may be received from a three dimensional (3D) camera, depth camera, z-camera, range camera, or from a plurality of sources. For example, the color image may be received from a color camera, the depth image may be received from a depth camera, and the infrared intensity image may be received by an infrared camera. In some embodiments, the color information, depth information, and infrared intensity information may be received from a single camera. For example, the color information may be received from a red-blue-green (RGB) sensor on a camera and the depth and/or infrared intensity information may be received from an infrared (IR) sensor comprised within the same camera. Further details with regard to the camera are described with relation to FIG. 13. As such, the method 300 may receive color information, infrared intensity information, and depth information of a video.

In some embodiments, a user is extracted from a video. For example, the foreground comprising a user of a video may be extracted to create a foreground video. In some embodiments, the user extraction is performed by using the color image and the depth image. Further details with regard to the user extraction are discussed with relation to FIGS. 4, 5, and 6. As such, the method 300 may comprise illumination correction of an entire image frame of a video if no user extraction is performed or a subset of the image frame of the video by using a user extraction method.

At block 320, a transformed infrared intensity image may be generated. For example, the infrared intensity image may be transformed to match the viewpoint of the color image. In some embodiments, an RGB sensor may create the color image of a scene at a first viewpoint and an infrared sensor may create the infrared intensity image of the scene at a second viewpoint. In some embodiments, the displacement between the RGB sensor and the infrared sensor may be known. As such, the displacement or shift between the viewpoints of the color image and the infrared intensity image may be used to transform the infrared intensity image to create a transformed infrared intensity image with a viewpoint that matches the viewpoint of the color image. Further details with regard to the transformation of the viewpoint of an image are discussed with relation to FIGS. 7, 8, and 9.

At block 330, a hybrid intensity image may be created. In some embodiments, the hybrid intensity image is created from the color image and the infrared intensity image. For example, the hybrid intensity image may be created by fusing the color image with the transformed infrared intensity image. Further details with regard to the creation of the hybrid intensity image are discussed with relation to FIGS. 10, 11, and 12.

Figure 4:
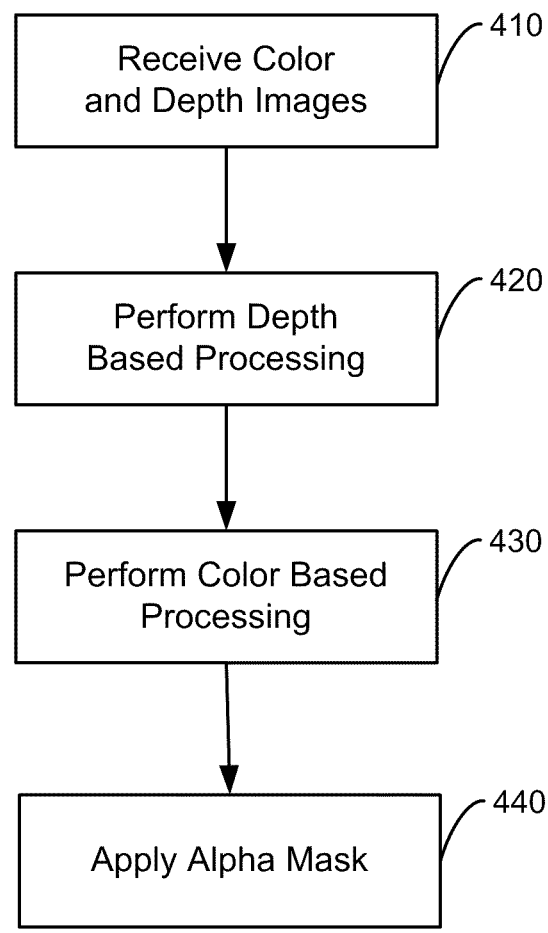
FIG. 4 is a flow diagram illustrating an example embodiment of a method for accurate user foreground video extraction.

FIG. 4 illustrates an example method 400 for accurate user foreground video extraction that may be used in some embodiments of the illumination correction method as disclosed herein. In some embodiments, the identified background portion may be removed to create a foreground video. In general, the method 400 processes a depth image and a color image to extract a user foreground video. In some embodiments, the user or foreground may be extracted from the color image. In some embodiments, the user or foreground may be extracted from an infrared intensity image. For example, pixels of the infrared intensity image that correspond to the extracted pixels of the color image may be extracted.

As seen in FIG. 4, at block 410, a color image and a depth image is received. The depth image may comprise information indicating the distance of each pixel of an image frame of a video from a sensor. At block 420, the depth image is processed as further discussed with relation to FIG. 5. At block 430, the color image is processed as discussed in more detail with relation to FIG. 6. Finally, at block 440, an alpha mask may be applied to the resulting image.

Figure 5:
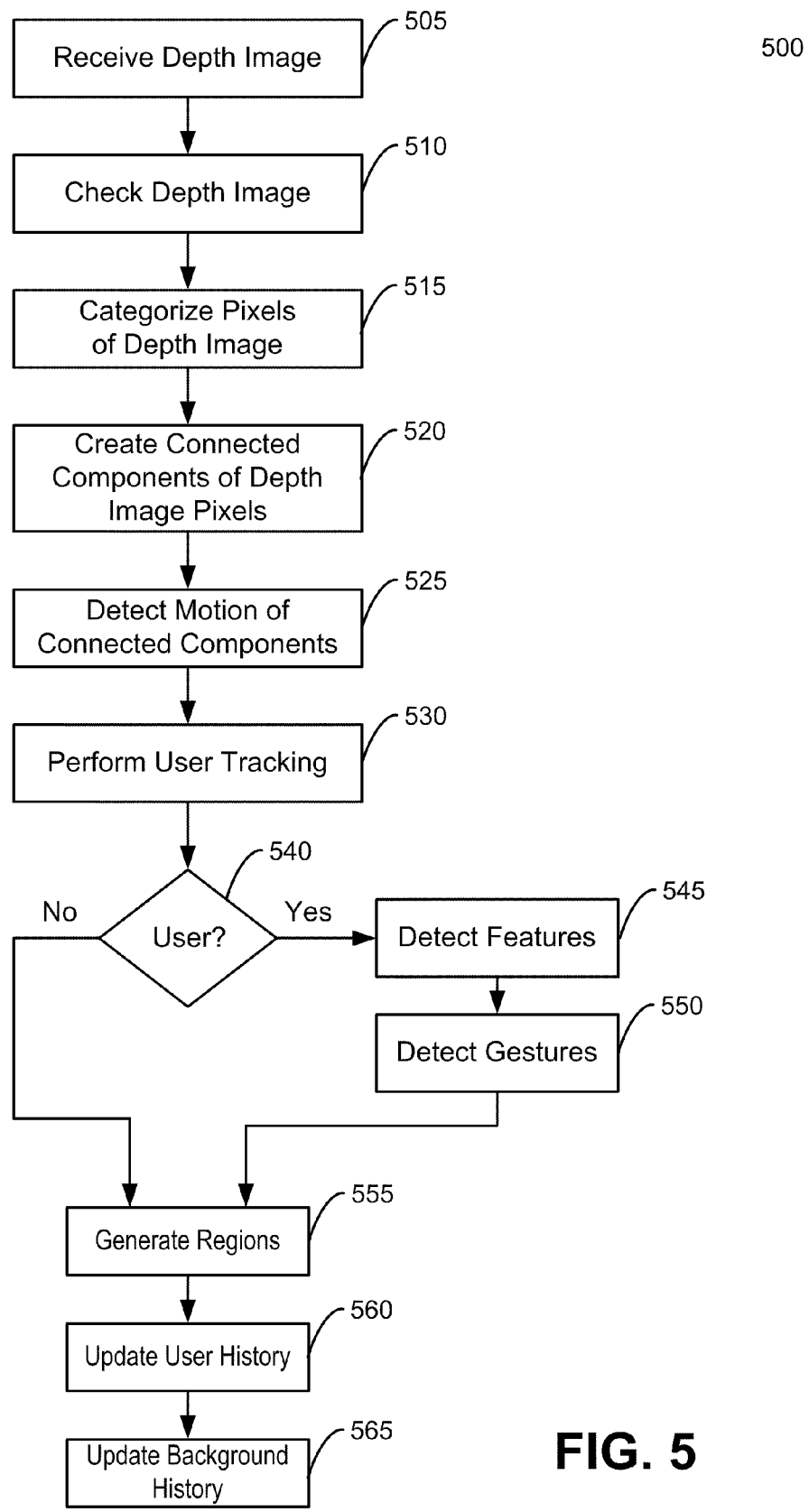
FIG. 5 is a flow diagram illustrating an example embodiment of a method for depth based processing for identifying a foreground portion and a background portion of a video.

FIG. 5 illustrates a method 500 for depth based processing for the identifying of a foreground portion and a background portion of a video. In some embodiments, the identified background portion may be removed to create a foreground video. In general, the method 500 receives depth image information and categorizes image pixels based on the depth image information.

As seen in FIG. 5, at block 505, a depth image is received. At block 510, the depth image is checked. In some embodiments, upon receiving a new depth image frame from a camera, the depth image frame is checked to determine whether the depth information is useful. For example, if the majority of pixels from the depth image comprise small or invalid values then the depth image frame may be considered to not be useful and as such may be discarded. In some embodiments, if a depth image frame is discarded then all pixels in the region map (described in more detail below) are set to 'unknown.' Moreover, in some embodiments, if a large number of consecutive depth image frames (e.g., 20 consecutive frames) comprise invalid depth information, then all depth histories (described in further detail below) and user information may be cleared or deleted.

At block 515, individual pixels of the depth image frame are categorized. Each pixel may be categorized or determined to belong to a section of the depth image frame. For example, each pixel may be categorized as unknown, background, a user pixel, or as a bad pixel. In some embodiments, there may be a plurality of types of user pixels. For example, each user may comprise a separate user pixel identification in order to keep different users separate. In some embodiments, the categorization of the pixels is based on a background history and user histories. Each of the background history and each user history comprises an aggregate history of the background pixels and user pixels as compiled from previous depth image frames. For each pixel of a received depth image frame, the current depth value is compared to the depth value in the background and foreground histories and ideally matched as either background or a user. In some embodiments, how close a pixel's current depth value must match either of the background or user histories may be based upon a confidence level threshold of the pixel. For example, to determine the best match (e.g., whether the pixel is a user or background) may comprise a cost calculated for each history and the history with the lowest cost may be chosen to be the pixel's section or categorization. If the depth value of a current pixel does not match any of the background or user histories, then the pixel may be labeled as unknown. In some embodiments, if the pixel has an invalid depth value or a depth value beyond a threshold, then the pixel may be labeled as an invalid pixel (e.g., a bad pixel).

As seen in FIG. 5, at block 520, connected components of the depth image pixels are created. In some embodiments, the creation of connected components may group pixels into components based on the pixel's section or categorization and the pixel's depth value. For example, each pixel's depth value and categorization (i.e., user, unknown, or background) may be compared with its neighboring pixels' depth value and categorization. In some embodiments, the categorization may comprise a different categorization for each user. As such, a plurality of user categorizations may be used. If neighboring pixels share a common categorization and have similar depth values, then the neighboring pixels may be considered to be a part of a single component. However, for pixels that are categorized as having an invalid depth, the pixel's depth value is not compared with a neighboring pixel's depth value. As such, neighboring pixels with an invalid depth categorization will be grouped into a single component. In some embodiments, in order to reduce computational resources, disjoint sets are used to manage the connected components. Once the connected components are determined (e.g., components are created for foreground components, background components, etc.) each component comprising the pixels categorized as unknown are examined. A determination may be made to decide whether the unknown component is connected to a known component such as a background or foreground component. For example, for each unknown component, a list of connections to known categorized components is generated. If the unknown component is connected to one or more known categorized components, then the categorized component selected for the unknown component is based on the total number of connections and the total depth difference between the unknown component and the categorized component. For example, if an unknown component comprises a large number of connections to a background component and there is a small depth difference between the unknown component and the background component, then the unknown component may be categorized as a background component. As such, all pixels in the unknown component may be categorized as a background component and included in the background component. Thus, the previously unknown pixels are regrouped into the background component pixels.

At block 525 of FIG. 5, a motion detection of connected components is performed. The motion detection determines if a component is moving between depth image frames. A moving component may be determined to be a person (e.g., a user). As such, a user may be detected at block 525. In some embodiments, a camera may provide an infrared intensity image and as such the difference between the infrared intensity or depth value of the current image frame and a previous image frame may be calculated. If a pixel's infrared intensity increases by a significant amount and the pixel's value is below a specific threshold, then the pixel may be marked as moving. In embodiments where the camera does not provide an infrared intensity image, a pixel may be considered to be moving if its depth value decreases by a specific amount and the pixel depth value is below a specific threshold. Each component comprising a moving pixel may be further examined. If the number of moving pixels in a single component is above a predefined minimum amount and the percentage of moving pixels is not small relative to all pixels of the component, then the component may be tagged as being in motion and as such may comprise a user.

As seen in FIG. 5, at block 530, user tracking is performed on the connected components. In some embodiments, user tracking may be performed at every few frames and result in the analysis of all of the connected components. In some embodiments, a connected component in motion must have a user head detected in order for the connected component to be categorized as a user. For example, for an unknown component, the user tracking may comprise checking the unknown component to determine whether the unknown component should be a foreground component or if it is a part of an existing foreground component (e.g., the unknown component is a user). If the unknown component is not part of an existing user, then the unknown component may be a new user and thus is analyzed through additional processes at blocks 545 and 550. Similar processes are performed for a background component. However, for a background component to be re-categorized as a foreground or user component, the background component must be approximate to a user's center of mass. Moreover, in some embodiments, a new user must have additional features detected and must be in motion. If a background component is determined to be a part of a user or a new user, then the component is removed from the background history.

The performance of the user tracking at block 530 may further comprise processing checks on foreground or user components. For example, if a foreground or user component is far from a user's center of mass, then it may be re-categorized as an unknown component. If a user component is close to another user's center of mass, then it may be removed from the current user and into the second user's history. In some embodiments, following the previously described processing steps, the user's information may be updated based on the current frame. For example, information related to a user's center of mass, dimensions, and motion may be updated. As such, the positioning and placement of a user may be detected such that a user's gestures may be detected, as described in further detail below. In some embodiments, a detected gesture from a user may enable or disable the user from the system or the user's standing placement (e.g., depth threshold) may be used to enable or disable the user. As such, a history of various characteristics of a user are recorded and updated.

If it is determined that a component is a user at block 540, then at block 545, the user's features are detected. In some embodiments, the features detected may comprise a user's head and hands. To do so, the user's torso and neck may first be located by segmenting the user component into a plurality of horizontal slices and moving upward until the width of the horizontal slices begins to diverge from the average width by a set amount. After finding the user's torso and neck, the user's head is identified by examining an area above the identified neck. Once the user's head is found, then the user's hands may be identified by performing a skeletonization of the user component. In some embodiments, the user's hands may be assumed to be the furthest points to the left and the right of the user's torso.

As seen in FIG. 5, at block 550, a user component's gestures are detected. As such, at block 550, a user raising his or her hand may be detected. In some embodiments, the detection of a user's gestures is based on the previously provided position of the user's features. In some embodiments, a user raising his or her hand may be detected by a vertical line comprising the user's hand position as well as a distance.

At block 555, a region map may be created. In some embodiments, the region map may be created based on the previously discussed categorizations and user information. The region map may comprise values of foreground, background, unclear, and unknown. For a background component, the region is set to background. In some embodiments, an invalid depth component may be set to unknown. If the component is set to unknown, then it may be checked to see whether it is close in proximity to a user such that it may be considered to be part of the user and as such categorized as an unclear component. If the user is enabled then the user component may remain as a foreground component, but if the user is disabled, then the user component may be re-categorized as a background component. As such, in some embodiments, the region map may comprise a categorization of pixels and/or components as foreground, background, unclear, or unknown.

At block 560 in FIG. 5, user histories may be updated. In some embodiments, a user history is recorded and updated for each user. Each pixel in the user history may comprise a depth value and a confidence level. In some embodiments, the user history is updated for each received depth frame. The depth values may be updated using an exponential moving average. The confidence level may be updated so as to increase whenever a pixel is categorized as a user and the depth value is similar to the depth value in the user history. However, if the depth value is significantly different, then the confidence level may decrease. If a pixel is labeled as a background then the confidence level decreases, but if a pixel is labeled as another user, then the user confidence may decrease more slowly. As such, the user histories enable the systems and methods disclosed herein to determine which pixels are associated to which user in a following frame.

At block 565, a background history may be updated similar to the user history as previously described. In some embodiments, the background history may comprise two different types of histories such as a trusted and non-trusted history. The non-trusted history may be updated per each frame. When a pixel is labeled as a background and the depth value matches the depth value in the non-trusted history then the age of the pixel increases. If the age of the pixel reaches a defined minimum age, then the pixel is re-categorized as trusted. If the depth value continues to match the depth value in the trusted history, then the confidence level may increase. However, if the depth value does not match, then the confidence level will decrease and if the confidence level reaches zero then the history at the pixel may be re-categorized as non-trusted.

Figure 6:
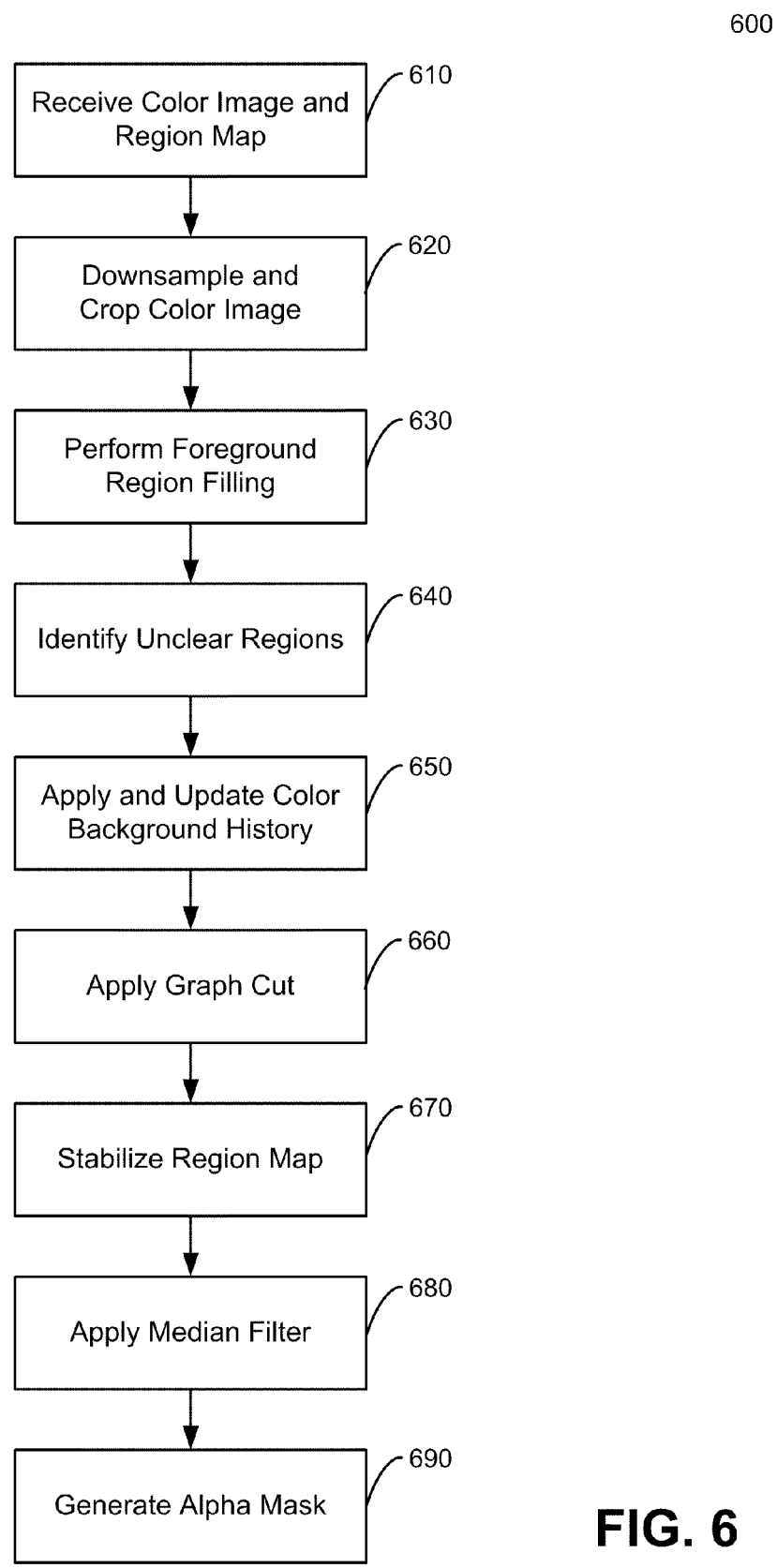
FIG. 6 is a flow diagram of a method for color based processing for the identification of a foreground portion and a background portion to extract a user foreground video.

FIG. 6 illustrates a flow diagram of a method 600 for color based processing for the identification of a foreground portion and a background portion to extract a user foreground video. At block 610, a color image is received. In some embodiments, a region map as previously discussed with regard to FIG. 5 may also be received. At block 620, the received color image may be down sampled and cropped. For example, if the resolution of the color image is high definition (HD), the color image may be down sampled to a lower resolution, such as a VGA-equivalent size (e.g., 640×480 resolution). In some embodiments, the boundaries of the received color image may not comprise depth information. As such, the boundaries of the color image may be cropped out or removed so that further processing on the color image may be more efficient.

At block 630 of FIG. 6, a foreground region filling may be performed. For example, in some instances, the depth image as received in FIG. 6 may comprise a reduced resolution than that of the color image. In such an instance, a warped foreground region may comprise a sparse set of pixels while unknown pixels within the sparse set of pixels should be labeled as foreground pixels. As such, for each unknown pixel, a local window surrounding the pixel may be searched for other foreground pixels. If the unknown pixel is surrounded by foreground pixels, then it may be assumed that the unknown pixel lies within the sparse set of foreground pixels and should thus be re-categorized or labeled as a foreground pixel.

At block 640, unclear regions of the color image may be identified and segmented out of the foreground and background regions of the color image so that further processing may be performed on the unclear region. The unclear region may comprise the area or set of pixels of which may not yet be categorized as a background pixel or a foreground pixel. As previously discussed, foreground region filling may be performed on unknown pixels that are surrounded by foreground pixels. However, if an unknown pixel is not surrounded by foreground pixels, then it may be comprised within an unclear region. For example, an unclear region may comprise pixels at the position of a user's hair. An unclear region surrounding a user's body may be further identified by expanding the contour line of the user body outwards and/or inwards to become a region. As such, unclear regions may be identified.

At block 650, a color background history may be applied and updated. The color background history may comprise the accumulated color values of a plurality of color images. In some embodiments, the color background history may be used to remove unclear head pixels from the unclear region that comprise color values that are similar with the corresponding color values in the color background history. In some embodiments, the application of the color background history may be performed before the processes described with relation to block 640 so as to create a more efficient color image process. The color background history may also be used when applying a graph cut as described in further detail below.

At block 660, a graph may be constructed. For example, a graph may be constructed by all of the pixels in the identified unclear region, along with any foreground and background pixels that is adjacent to the unclear region. Each pixel is then connected to its 4 or 8 neighboring pixels and a source that represents the foreground and a sink that represents the background. In some embodiments, N-links may be inter-pixel links. Terminal links (T-links) may comprise links connecting a pixel to the source or the sink. The capacities of the N-links may be assigned based on the color contrast (L1 norm) between pixels based on the following equation:

$$cap_N(i, j) = \begin{cases} \lambda_N e^{-\beta_N \|p_i - p_j\|_1} & \text{if} \|p_i - p_j\|_1 < \delta_N \\ 0 & \text{else} \end{cases}$$

The capacities of the T-links may comprise the summation of several factors. One such factor may comprise the probability with respect to the Gaussian mixture models of the background and the Gaussian mixture model of the foreground. These models may be learned and updated using the detected background pixels from the previous color image frames. Another factor may comprise the temporal coherence of the region map of the current image frame and the region map of the previous image frame. For each pixel i in the graph, a value cap(i) (capacity) may be defined as the following equation:

$$cap(i) = \begin{cases} \lambda_T e^{-\beta_T \|p_i^{current} - p_i^{previous}\|_1} & \text{if} \|p_i^{current} - p_i^{previous}\|_1 < \delta_T \\ 0 & \text{else} \end{cases}$$

If the pixel i is categorized as a foreground pixel in the previous image frame's region map, then $cap_{source}(i)=cap(i)$ and $cap_{sink}(i)=0$. However, if the pixel i is categorized as a background pixel in the previous image frame's region map, then set $cap_{source}(i)=0$ and $cap_{sink}(i)=cap(i)$.

A third factor may comprise the color contrast (L1 norm) between a pixel in the graph and its color background history, as in the following equation:

$$cap_{source}(i) = 0;$$

$$cap_{sink}(i) = \begin{cases} \lambda_T e^{-\beta_T \|p_i^{current} - p_i^{previous}\|_1} & \text{if} \|p_i^{current} - p_i^{previous}\|_1 < \delta_T \\ 0 & \text{else} \end{cases}$$

In some embodiments, the $cap_{source}$ of the foreground pixels in the graph may be set to a large enough constant number to prevent its categorization as a background pixel by the graph cut algorithm. Similarly, the $cap_{sink}$ of the background pixel must also be set to a large constant number. As such, a fast binary graph cut may be performed on the graph based on a number of factors to obtain a segmentation between the foreground and background.

At block 670, the region map may be stabilized in order to reduce small temporal flickering of the foreground-background edges (e.g., edge waviness artifacts). Noisy pixels may be detected in the unclear region of the region map before the graph cut is performed by counting the foreground to background and background to foreground transition time of each pixel. For every new frame and for each pixel of the new frame, if the pixel doesn't transition from one categorized region to another categorized region (e.g., from a foreground region to a background region), its transition count may decrease. However, if the pixel does transition from a categorized region to another categorized region (e.g., from a background region to a foreground region), then the pixel transition count may increase. If a pixel's transition count is above a threshold value, the region categorization of the pixel may be copied from the pixel's region categorization from the previous image frame's region map.

In some embodiments, at block 680, a median filter may be applied to the identified foreground region in order to smoothen the foreground edges. The median filter may be applied in the following pseudo code manner:

```
For each pixel p in UC region
{
  Count = 0;
    For each pixel p_i in the NxN support window around pixel p {
      If R(p_i) = FG, count++;
    }
    If (count<N*N/2), R(p) = BG;
    Else R(p) = FG;
}
```

At block 690, an alpha mask may be generated to convert the foreground categorized pixels to a 0xFF alpha value and convert other categorized pixels to a 0x00 alpha value. In some embodiments, this may comprise an up sampling for the alpha mask.

Figure 7:
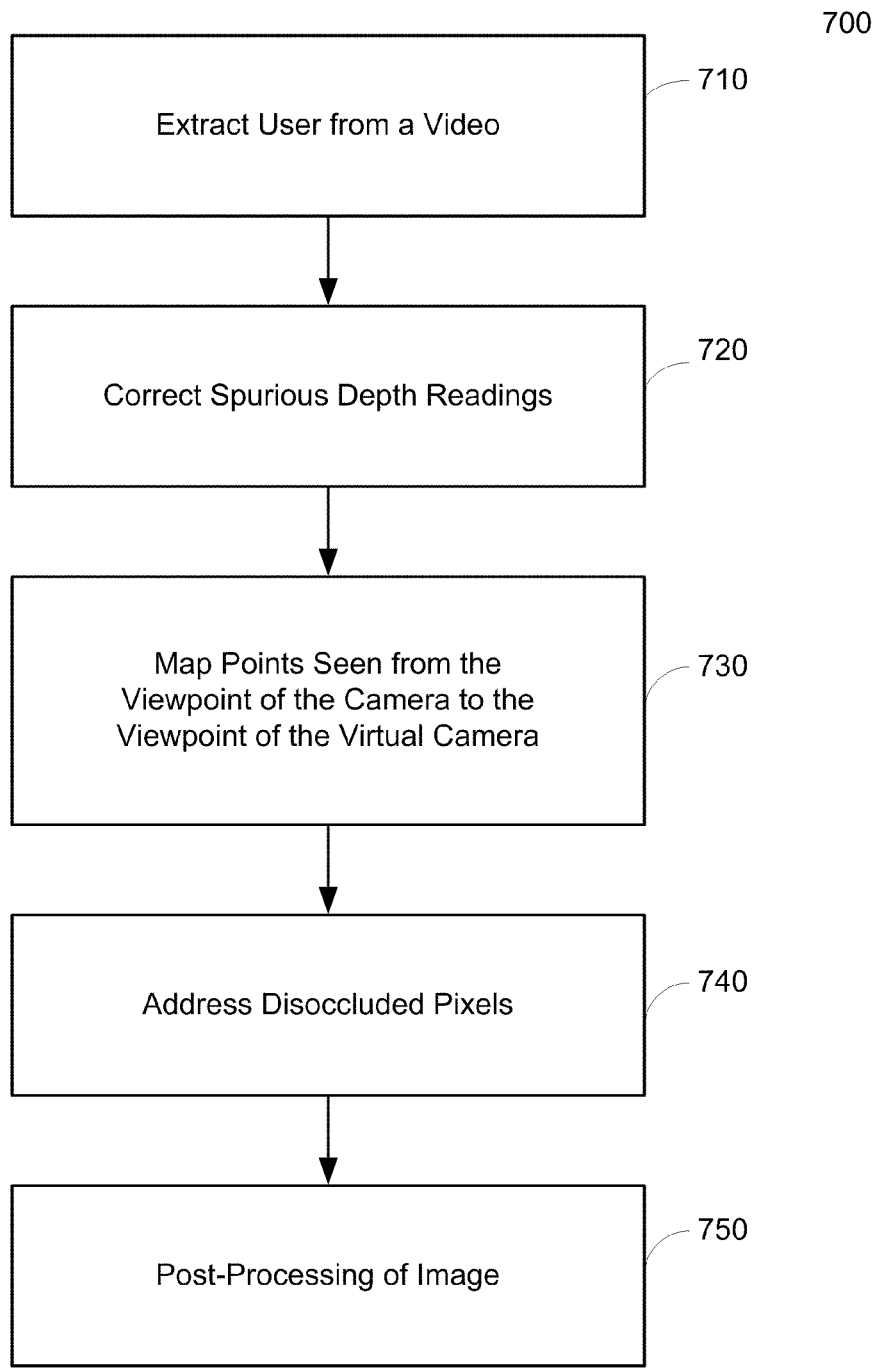
FIG. 7 illustrates a flow diagram of a method for generating a virtual camera viewpoint of an image of a video in accordance with some embodiments.

FIG. 7 illustrates a method 700 for generating a virtual camera viewpoint of an image in accordance with some embodiments. In general, the method 700 extracts a user from a video by using a depth image and a color image or an infrared intensity image and maps points or pixels seen from a viewpoint of the camera to a viewpoint of a virtual camera. However, in some embodiments, the method for generating a virtual camera viewpoint may not extract a user from the video and, and such, may process the entire image. As such, in some embodiments, an infrared intensity image may be transformed such that it is mapped to points or pixels as seen from a viewpoint of the color image or RGB sensor.

As seen in FIG. 7, at block 710, a user may be extracted from a video comprising a color image and/or an infrared intensity image and a depth image. For example, the user is detected in a foreground and separated from the background of the video. Further details with regard to the user extraction of block 710 are described with relation to FIGS. 4, 5 and 6. However, in some embodiments, the user may not be extracted.

At block 720, spurious depth values from the extracted user video are corrected. For example, a bilateral filter may be applied to regions or pixels where the depth value comprises an unknown depth value. In some embodiments, the bilateral filter may drop off in terms of space and similarity of nearby pixels. A measure of similarity of nearby pixels may be determined by information from the color image. For example, using a Gaussian kernel in conjunction with the color image information, the following equation may determine the output of the bilateral filter:

$$BF[D]_p = \frac{1}{W_p} \sum_{q \in S} G_{\sigma_s}(\|p - q\|) G_{\sigma_r}(\|RGB_p - RGB_q\|) D_q$$

In some embodiments, $BF[D]_p$ comprises the output of the bilateral filter at a point p, $W_p$ comprises a weighting factor, S comprises a neighborhood of p, $RGB_\chi$ comprises the color value at $\chi$, $D_q$ comprises the depth value at q, and $G_\sigma$ comprises a Gaussian kernel. As previously discussed, the bilateral filter may be applied to regions where the depth value is unknown. In some embodiments, applying the bilateral filter to such regions preserves image fidelity and reduces computational resources. In some embodiments, a camera may further provide a confidence value for each corresponding depth value for each pixel (e.g., through a reflected infrared intensity). As such, the bilateral filter may be applied to pixels with a confidence value at, below, or above a defined threshold value of the confidence value. In some embodiments, the bilateral filter may be applied repeatedly in order to gradually fill a large region comprising pixels of an unknown depth value.

An alternative method to correct spurious depth values may comprise fitting a plane on the set of three dimensional (3D) points corresponding to depth pixels on the unknown region comprising unknown pixels. In some embodiments, such a method may approximate the extracted user with a 3D plane similar to a cardboard cutout. The fitting of the 3D plane may leverage the averaging effect to provide a robust estimation of the depth values of the unknown pixels and may correct missing depth values. In some embodiments, such a method may be used in conjunction with the bilateral filter as previously described.

At block 730 of FIG. 7, pixels or points seen from the viewpoint of the reference or actual camera are mapped or translated to points seen from a viewpoint of a target or virtual camera. In some embodiments, the actual camera for the infrared intensity image may comprise the infrared sensor and the target or virtual camera may comprise a location of the virtual camera at the RGB sensor. For example, if the RGB sensor and the infrared sensor comprise a 3-centimeter displacement between the sensors, then the target or virtual camera location for the transformed infrared intensity image may comprise a shift of 3 centimeters. Further details with regard to the mapping of pixels or points from the viewpoint of the actual camera to the points seen from a viewpoint of a virtual camera are described with relation to FIGS. 8 and 9. At block 740, disoccluded pixels are addressed or processed. Further details with regard to the addressing or processed of disoccluded pixels are described below. At block 750, post-processing of the resulting transformed image reflecting the new viewpoint of a virtual camera is performed. For example, a blurring or bilateral filter may be applied to smooth the transformed image. In some embodiments, a morphological or connected component analysis may be used to eliminate artifacts in the transformed image.

Figure 8:
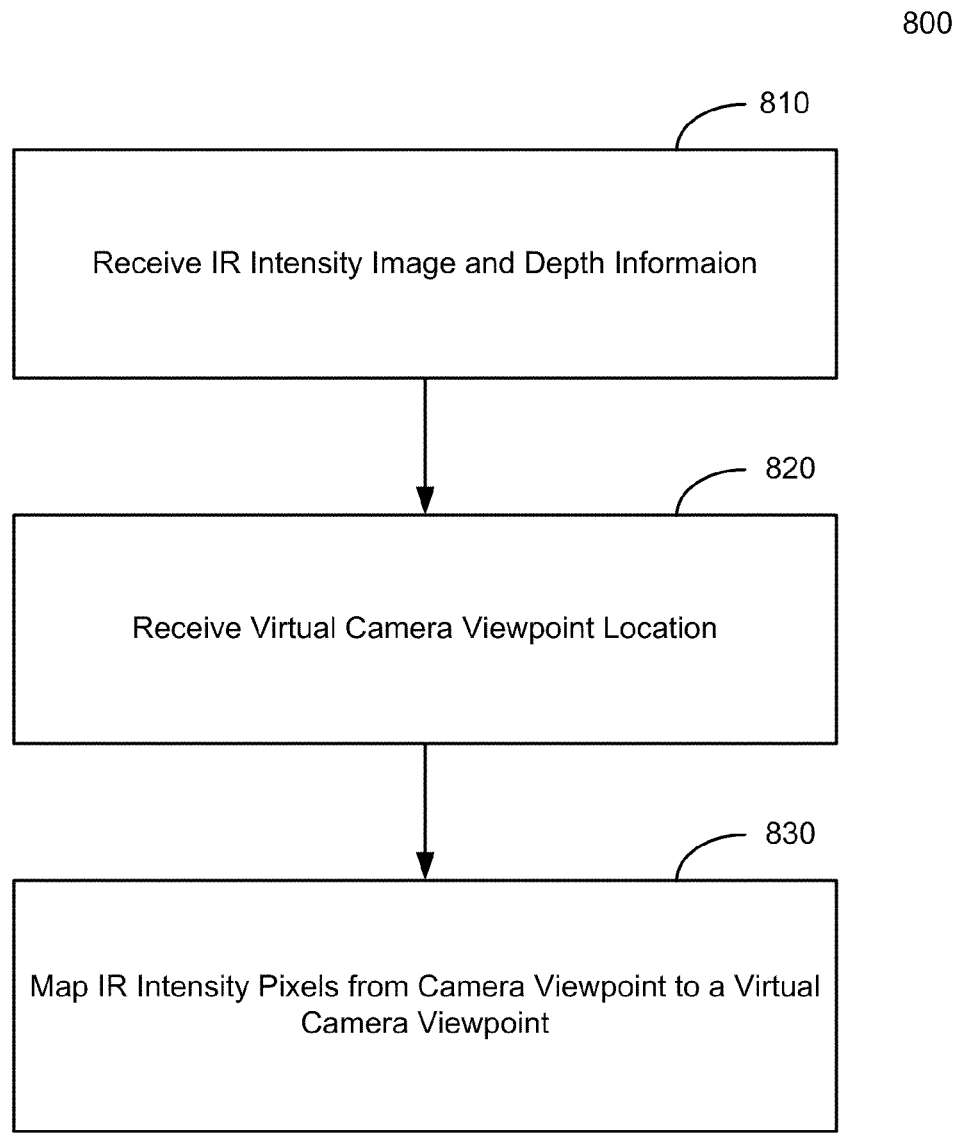
FIG. 8 is a flow diagram of an example method for mapping pixels from an image to points from a virtual camera viewpoint of the image.

FIG. 8 illustrates an example method 800 for mapping or translating pixels from an actual camera center or viewpoint of an image to points of a virtual camera center or viewpoint. In some embodiments, the virtual camera center or viewpoint for the infrared intensity image may comprise a shift equivalent to the displacement between the RGB sensor and the infrared sensor. In general, the method 800 receives color or infrared intensity information and depth information and maps or translates color or infrared intensity pixels from an image from an actual camera viewpoint to a virtual camera viewpoint of the image. In some embodiments, the method 800 may map or translate infrared intensity pixels from an infrared intensity image to a virtual camera viewpoint comprising that of the RGB sensor.

As seen in FIG. 8, at block 810, color (or infrared intensity) and depth information is received. In some embodiments, the color and depth information comprises color and depth information of a foreground or user extracted from a video as previously discussed. At block 820, a virtual camera viewpoint location is received. In some embodiments, the virtual camera viewpoint location is received from a user input or automatically detected or provided. At block 830, pixels or points of an image as seen from a reference or actual camera are mapped to points corresponding to a viewpoint of a virtual camera. In some embodiments, the mapping of pixels or points may comprise reversing the projection matrix of the camera to find world coordinates of every point or pixel seen in 3D. The projection matrix of a viewpoint of a virtual camera may then be applied to generate an output image reflecting the viewpoint of the virtual camera. Each point of an image in 2D space may be mapped one-to-one with a ray in 3D space that may intersect the camera, position or viewpoint. For example, a 2D image plane comprising basis vectors $(\vec{s}, \vec{t})$ and a 3D space comprising vectors $(\vec{i}, \vec{j}, \vec{k})$ may comprise a 2D point to 3D ray mapping relationship as the following formula:

$$\vec{r} = \begin{bmatrix} r_i \\ r_j \\ r_k \end{bmatrix} = \begin{bmatrix} \vec{s}_{ijk} & \vec{t}_{ijk} & f*\vec{w}_{ijk} \end{bmatrix} \begin{bmatrix} u \\ v \\ 1 \end{bmatrix} = P \begin{bmatrix} u \\ v \\ 1 \end{bmatrix}$$

In some embodiments, (u,v) may comprise the 2D coordinate of a point in the image plane, $\vec{r}$ may represent the corresponding 3D ray direction, $\vec{s}_{ijk}, \vec{t}_{ijk}$ and $\vec{w}_{ijk}$ may comprise representations of $\vec{s}, \vec{t}$ and the viewing direction $\vec{w}$ in $\{\vec{i}, \vec{j}, \vec{k}\}$, and f may comprise the focal length of the camera. In some embodiments, the matrix P of the above formula may be a mapping matrix. A point X in 3D space $\{\vec{i}, \vec{j}, \vec{k}\}$ may next be used. For example, $\vec{x}_r$ and $\vec{x}_d$ may respectively comprise homogeneous coordinates of X in the reference or original image plane and the target, desired, or virtual image plane. $P_r$ and $P_d$ may comprise mapping matrices of the reference or actual camera and the target or virtual camera. The mapping equation between $\vec{x}_r$ and $\vec{x}_d$ may then be defined as:

$$\vec{x}_d = P_d^{-1}\left(\frac{|P_r \vec{x}_r|}{d(\vec{x}_r)}(C_r - C_d) + P_r \vec{x}_r\right)$$

In some embodiments, $d(\vec{x}_r)$ may be the depth value of point $\vec{x}_r$, $C_r$ may comprise the center of the reference or actual camera, and $C_d$ may comprise the center of the target or virtual camera. As such, the above equation may be used to map each pixel or point from a viewpoint of an image from a camera to a point associated with a viewpoint of the image from a virtual camera or position.

Figure 9:
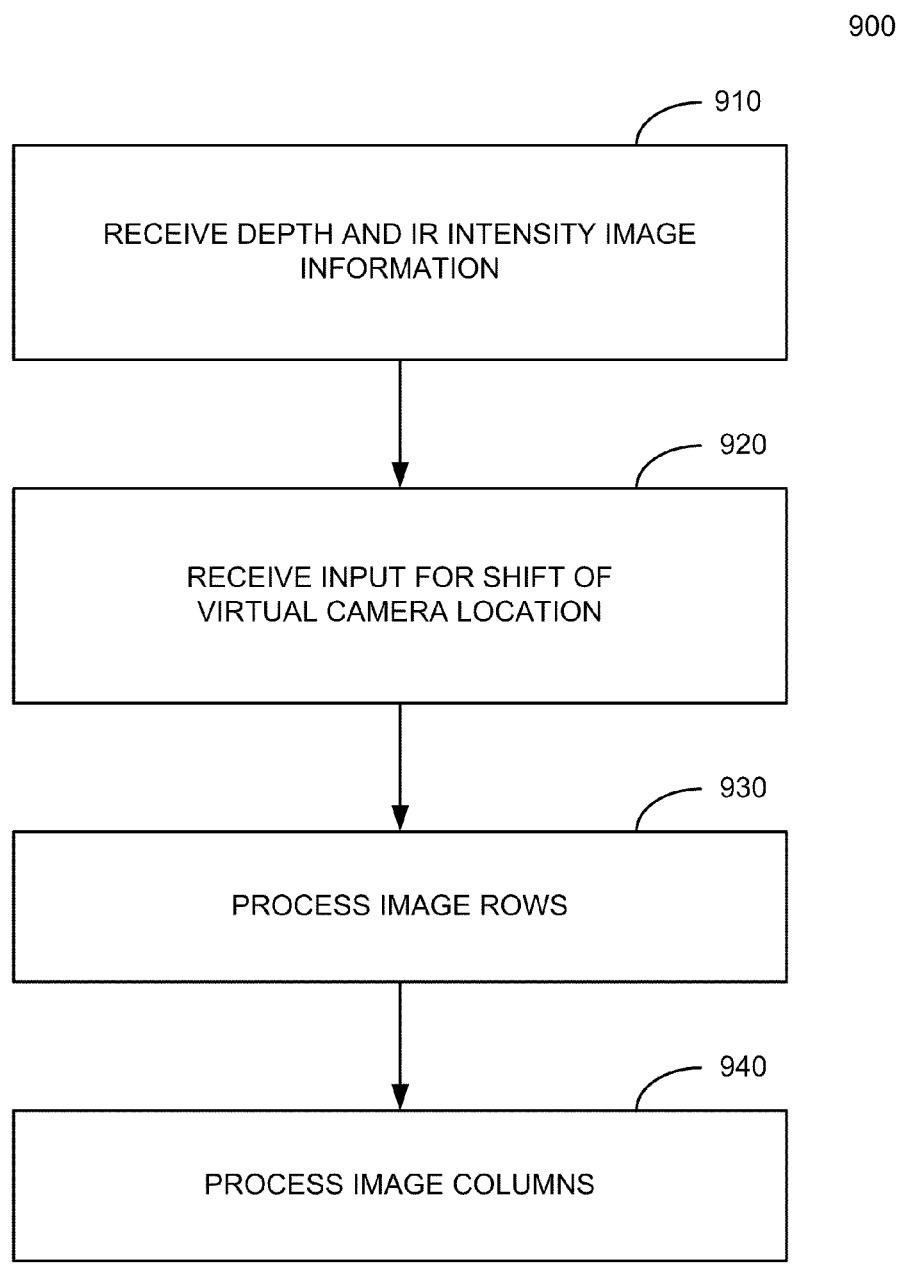
FIG. 9 is a flow diagram of a method for translating pixels from an image to points of a virtual camera viewpoint by shifting by rows and columns in accordance with some embodiments.

FIG. 9 illustrates an example method 900 for translating or mapping points or pixels from an image to points of a virtual camera viewpoint by shifting by rows and columns of the image. In some embodiments, the method 900 may comprise an alternative to the method 800 of FIG. 8. In general, the method 900 receives infrared intensity and depth information and translates infrared intensity pixels or points from a camera viewpoint to points of a virtual camera viewpoint. In some embodiments, the virtual camera viewpoint may comprise a shift equivalent to the displacement between the infrared sensor and the RGB sensor.

As seen in FIG. 9, at block 910, infrared intensity and depth information is received. In some embodiments, the infrared intensity and depth information may comprise an infrared intensity image and a corresponding depth image. The infrared intensity image and the corresponding depth image may be that of a user or foreground extracted from a video as previously described. However, in some embodiments, the images may comprise no user extraction. At block 920, an input for shifting or translating of the camera center to a virtual camera viewpoint is received. For example, the input may comprise shifting the camera center of the image by 30 centimeters to the left. As such, a virtual camera viewpoint may be located 30 centimeters to the right from the actual camera center. In some embodiments, the input may comprise a horizontal shift and a vertical shift. For example, the input may comprise a shifting of the camera center of the image by 25 centimeters to the right and 15 centimeters upwards. As such, the input comprises a horizontal shift of 25 centimeters and a vertical shift of 15 centimeters. Thus, a virtual camera location may be shifted in any direction (e.g., up, down, left, and right) in one or both of a vertical dimension and a horizontal dimension. At block 930, each of the rows of the image are processed to reflect the virtual camera location and, at block 940, each of the columns are processed to reflect the virtual camera location.

In some embodiments, the horizontal and/or vertical shifting from an actual camera center or viewpoint to a virtual camera center or viewpoint comprises shifting pixels of the image in a particular image dimension (e.g., horizontal or vertical). As such, in some embodiments, the camera center or viewpoint of an image is translated or moved to a virtual camera center or viewpoint along horizontal and vertical dimensions. As previously discussed with regard to blocks 930 and 940 of FIG. 9, the image is processed row by row and column by column. As such, the processing of the image may be more efficient. For example, if the shift of the camera center or viewpoint to the virtual camera center or viewpoint is only along a horizontal dimension, then the image may be processed row by row. Likewise, if the shift of the camera center or viewpoint to the virtual camera center or viewpoint is only along a vertical dimension, then the image may be processed column by column. However, if a shift of the camera center, viewpoint, or location is along both horizontal and vertical dimensions, then both a row by row and column by column shift may occur. Thus, the shifting of columns and rows of an image may be restricted to a sequence of one dimensional transformations (i.e., a row by row transformation followed by a column by column transformation or a column by column transformation followed by a row by row transformation).

In some embodiments, the amount of pixels or pointed shifted due to the shift of the camera center or viewpoint to a virtual camera center or viewpoint is determined by the following formula:

$$\Delta v = \frac{ft}{z(v, t)}$$

In some embodiments, f may comprise the focal length of the camera, t comprises the amount of translation from the reference or actual camera to the target or virtual camera location, and z(v,t) comprises the depth value of the pixel v at the reference or actual camera. As such, the amount of shift is based on the depth value.

Following the mapping methods as previously described, the transformation of an image to the target or virtual camera viewpoint may unveil portions of the image that were not seen by the reference or actual camera. For example, following a shift or transformation, facial regions of a user may comprise an unveiled portion. Such unveiled portions may be referred to as disoccluded regions and pixels within the disoccluded regions may be referred to as disoccluded pixels. In some embodiments, the image comprises an extracted user and, as such, the number of disoccluded pixels is minimized when compared to a transformation or mapping of an entire scene comprising the user foreground and a background.

Multiple methods may be used to address the disoccluded pixels. For example, small disoccluded regions may be filled by using color values from nearby (e.g., neighboring) pixels. In some embodiments, infrared intensity values of pixels near disoccluded pixels may be averaged together (for example, with weights) and the weighted average infrared intensity pixel value may be assigned to the disoccluded pixel. In further embodiments, the disoccluded region may simply be ignored. As such, the disoccluded region may comprise a missing portion in the transformed or mapped image. In some embodiments, the missing portion may be inpainted.

Additional post-processing may be performed after the addressing of the disoccluded regions. For example, blurring or bilateral filters may be applied in order to smoothen the transformed or mapped image. Morphological and/or connected component analysis (as previously described) may be used to eliminate artifacts within the transformed or mapped image.

Figure 10:
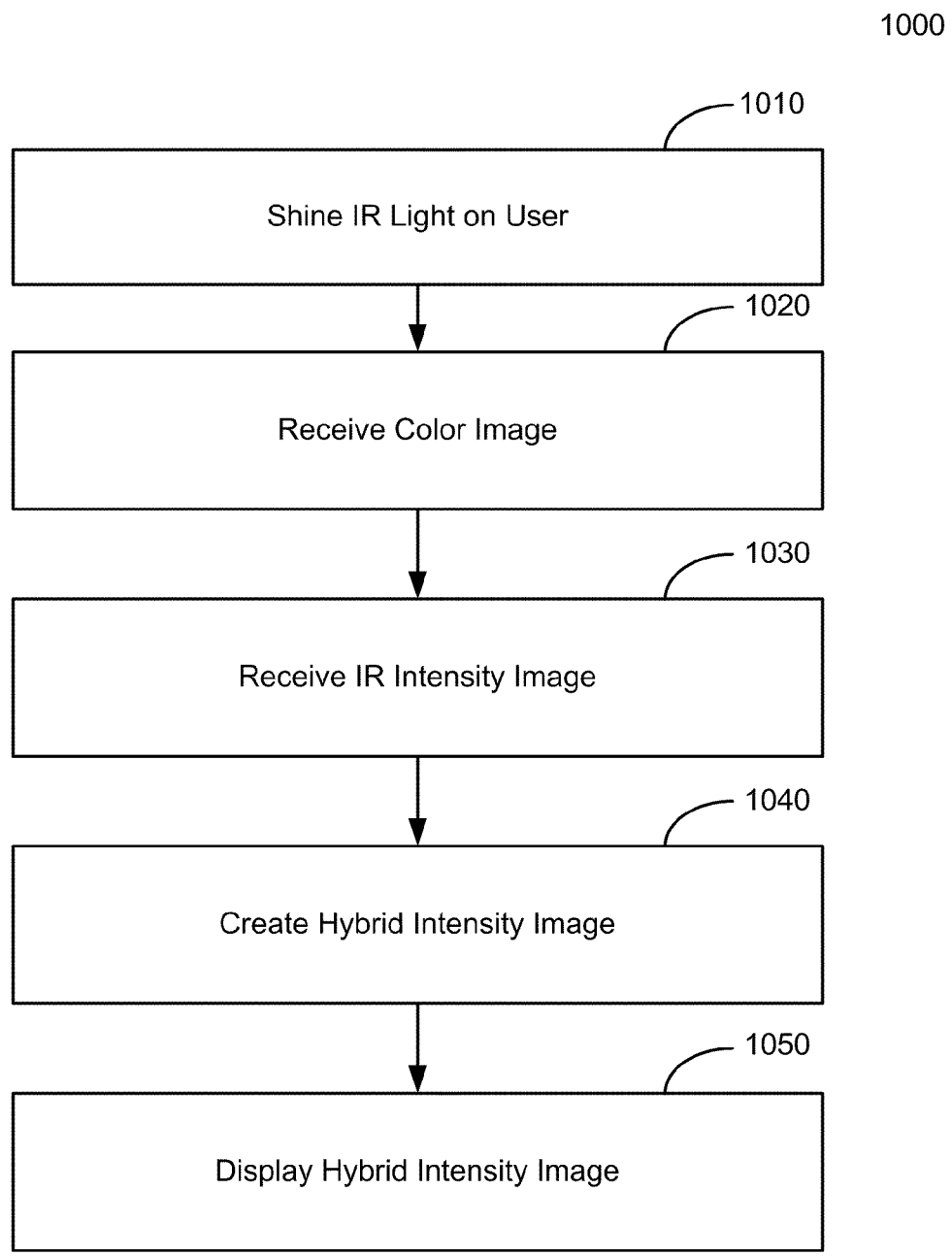
FIG. 10 illustrates a flow diagram of a method for providing a frontal illumination of an infrared light and creating a hybrid intensity image.

FIG. 10 illustrates a flow diagram of a method 1000 for providing a frontal illumination of an infrared light and creating a hybrid intensity image. In general, the method 1000 receives a color image and an infrared intensity image and displays a hybrid intensity image based on the color image and the infrared intensity image.

As seen in FIG. 10, at block 1010, an infrared light is shined on a user. For example, the infrared light may provide a frontal illumination of infrared light onto the user. However, since the infrared light comprises a wavelength longer than that of visible light, the frontal illumination of the infrared light is not visible to the user. In some embodiments, the infrared light is provided by an infrared illuminator, which may be a separate component or a part of a camera system comprising an infrared sensor and a color (e.g., RGB) sensor as discussed with relation to FIG. 13. Thus, a camera may be used such that the camera is capable of independently recording light in both the visible spectrum and the infrared spectrum.

At block 1020, a color image is received and, at block 1030, an infrared intensity image is received. In some embodiments, the infrared intensity image provides infrared intensity information of pixels. For example, the infrared intensity image may comprise an intensity value of each pixel in the infrared spectrum. At block 1040, a hybrid intensity image is created. Details with regard to the creation of the hybrid intensity image are discussed with relation to FIGS. 11 and 12. Finally, at block 1050, the created hybrid intensity image is displayed such that the hybrid intensity image has removed or deemphasized uneven lighting conditions and/or directional shadows across the user.

Figure 11:
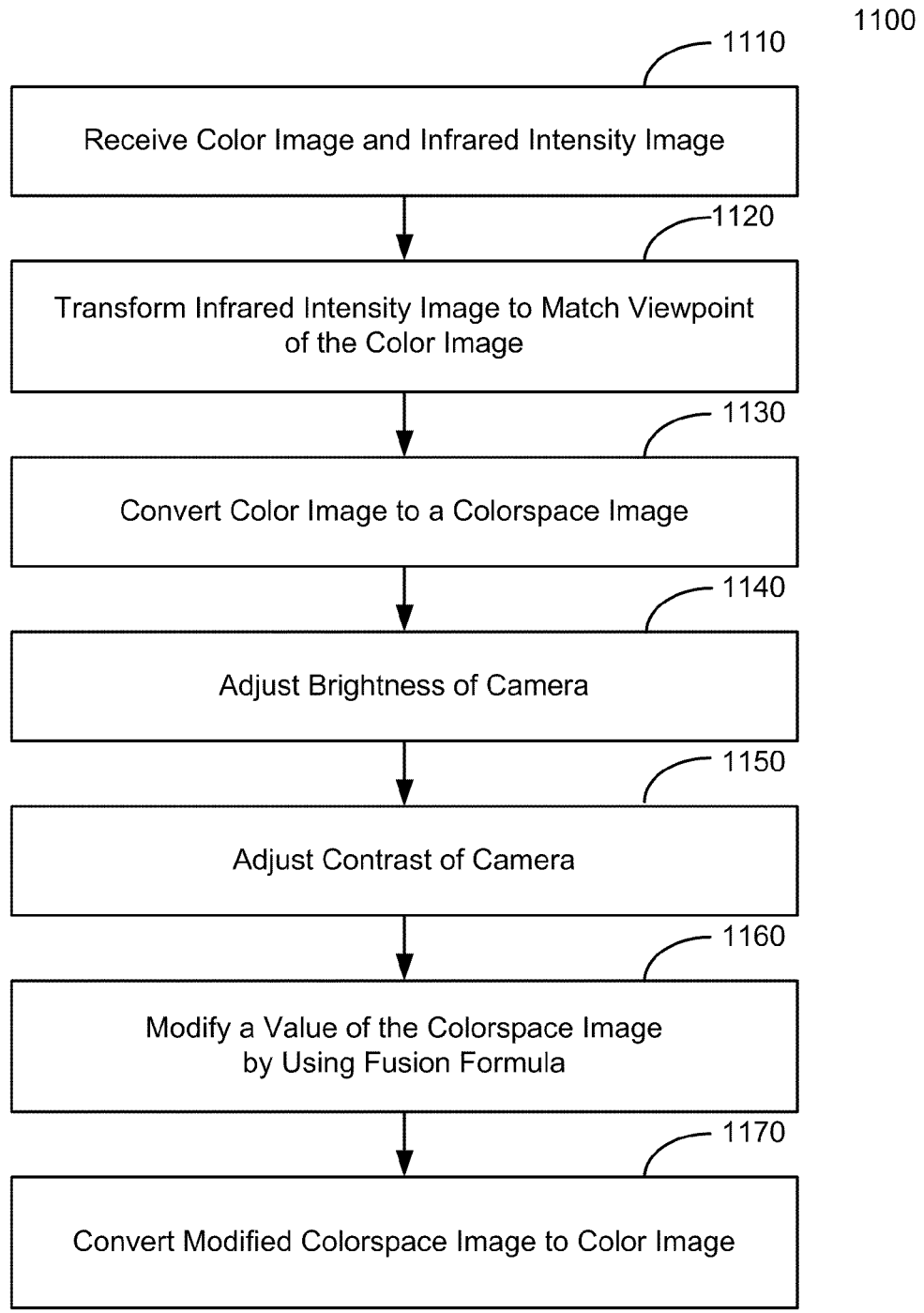
FIG. 11 illustrates a flow diagram of a method for creating a hybrid intensity image in accordance with some embodiments.

FIG. 11 illustrates a flow diagram of a method 1100 for creating a hybrid intensity image in accordance with some embodiments. In general, the method 1100 receives a color image and an infrared intensity image, processes the images, and creates a hybrid intensity image based on the color image and infrared intensity image.

As seen in FIG. 11, at block 1110, a color image and an infrared intensity image are received. At block 1120, a transformed infrared intensity image is created, as previously discussed with relation to FIGS. 7, 8, and 9. The transformed infrared intensity image may be created by mapping or shifting pixels of the infrared intensity image to match the viewpoint of the color image. For example, a displacement or distance between an RGB sensor and an infrared sensor may be known. As such, a virtual viewpoint may be created for the infrared intensity image to match the viewpoint of the color image. For example, a transformed infrared intensity image may comprise an identical viewpoint of the color image as seen from the location of the RGB sensor. Thus, the displacement or geometric correspondence between the RGB sensor and the infrared sensor may be used to transform the infrared intensity image to match the viewpoint of the color image or RGB sensor.

In some embodiments, pixel values may be linearly interpolated. For example, as previously discussed, the transformation of an image to a target or virtual camera (e.g., transforming the infrared intensity image to a viewpoint of the color image or RGB sensor) may unveil portions of the image that were not seen by the reference or actual camera (e.g., the infrared sensor). As such, these unveiled portions or disoccluded pixels may be linearly interpolated to fill in the disoccluded pixel values. For example, in some embodiments, the missing or disoccluded pixels may be interpolated based on neighboring pixels. For example, the linear interpolation may comprise using a weighted average of nearby or neighboring pixels, as previously discussed. As such, in some embodiments, linear interpolation of an infrared intensity image may comprise using the weighted average of infrared intensity values.

At block 1130 of FIG. 11, the color image may be converted from an RGB color model or colorspace to an image of another colorspace comprising a channel corresponding to a brightness or light intensity value. For example, the color image may be converted from an RGB colorspace to a Hue-Saturation-Value (HSV) colorspace image or a CIE-Lab colorspace image. As such, the RGB color image may be converted to a second colorspace image that comprises a channel or value for each pixel that may correspond to a brightness level or light intensity value of the pixel (e.g., HSV, CIE-Lab, YUV, YCrCb, etc.).

As mentioned above, the color image may be converted from an RGB colorspace to an HSV (Hue-Saturation-Value) colorspace or color model. In some embodiments, the 'V' or 'value' of the HSV color model or colorspace image may indicate a brightness of a particular pixel. As such, since it is presumed that the color of a pixel will not change when performing illumination correction, the 'hue' and 'saturation' values of the HSV color model are not changed or modified, but the 'value' of the of the HSV color model may be changed or modified in order to change the brightness for the creation of a hybrid intensity image. As such, the 'value' of each pixel of the HSV colorspace image may correspond to a brightness level or light intensity value of the pixel.

Alternatively, the RGB colorspace image may be converted to a CIE-Lab colorspace image or model. In some embodiments, the CIE-Lab colorspace image or model may comprise a luminance or brightness channel 'L.' The CIE-Lab colorspace image or model may comprise a colorspace with a dimension or channel 'L' for luminance and dimensions a and b. As such, the 'L' channel value of the CIE-Lab colorspace image may correspond to a brightness level or light intensity value for each pixel of the CIE-Lab colorspace image. In some embodiments, the conversion between the RGB colorspace to the CIE-Lab colorspace may be performed on a per pixel basis and performed via an intermediate space XYZ. For example, the conversion from the RGB colorspace to the CIE-Lab colorspace may comprise a conversion from the RGB colorspace to the XYZ intermediate space. Next, a conversion from the XYZ intermediate space to the CIE-Lab colorspace image may be performed.

At blocks 1140 and 1150 of FIG. 11, RGB brightness and RGB contrast may be performed. In some embodiments, the following described operations with relation to blocks 1140 and 1150 are only applied to the user extracted region resulting from the user extraction process as discussed with relation to FIGS. 4, 5, and 6. In general, values of a channel from the colorspace image corresponding to brightness or light intensity (e.g., 'V' from an HSV colorspace image and 'L' from a CIE-Lab colorspace image) may comprise values that are generally dark. For example, the brightness values of pixels that have been identified as a user may be low or comprise a low brightness value. As such, the adjustment of the brightness and contrast on this identified user region may maximize a dynamic range of pixel intensity or brightness distributions, and thus the visual appearance of the user on a display.

A proportional-integral (PI) controller may be used to control and adjust camera (e.g., color or RGB camera) settings or parameters for brightness and sensor gain in order to respectively adjust the brightness and contrast of the image received from the camera. In some embodiments, the adjustment of the brightness camera control adds a constant value to the output of each RGB pixel value and the adjustment of the sensor gain (e.g., contrast) may comprise a scalar multiplier. A target mean sample value (MSV) may be determined by the user or may be automatically determined by the system and method disclosed herein. As such, the proportional-integral controller or algorithm is applied to the adjustment of the camera control for the brightness and sensor gain or contrast in an alternating order to track a target mean sample value.

In some embodiments, the mean sample value may be calculated on the 'V' channel of an HSV colorspace image or the 'L' channel of a CIE-Lab colorspace image. As such, the mean sample value may be calculated on a channel of the colorspace image that corresponds to a brightness value or level. For example, calculating the mean sample value on the 'L' or luminance channel value (corresponding to brightness) of a CIE-Lab colorspace image may comprise partitioning the 'L' pixel values of the image into a histogram comprising five bins of values 0 through 50, 51 through 101, 102 through 152, 153 through 203, and 204 through 255, assuming 8 bit resolution. However, other values may be used. Thus, a weighted average of the raw pixel counts in each of the bins may be calculated as the following equation:

$$MSV = \frac{\sum_{k=0}^{5}(k+1)NL_k}{\sum_{k=0}^{5}NL_k}$$

In some embodiments, $NL_k$ may comprise the number of pixels in the 'L' channel that are within the intensity or brightness range of bin k. In some embodiments, for a target mean sample value $MSV_{target}$ and a current mean sample value at a time t, the proportional-integral controller or algorithm may update a given parameter u at a time t in accordance with the following equations:

$E(t)=MSV_{target}-MSV(t)$ $l(t)=\int_{t}^{0}e(t-\tau)d\tau$ $u(t)\leftarrow u(t-1)+K_pe(t)+K_Il(t)$ In some embodiments, $K_p$ and $K_I$ may comprise parameter specific and pre-defined scaling operators.

At block 1160 of FIG. 11, a fusion formula may be used to modify or change pixel values of a channel of the colorspace image to which the RGB image has been converted. For example, a fusion formula may be used to modify or change the 'V' channel of an HSV colorspace image or the 'L' channel of a CIE-Lab colorspace image. As such, the fusion formula may modify or change the value of a channel corresponding to brightness or light intensity of a colorspace image.

As previously discussed, the 'value' channel of the HSV color model or colorspace image may be modified or changed. For example, the 'value' of the HSV color model may be changed or modified base on the color image, transformed infrared intensity image, and fusion formula inputs. As such, the fusion formula may be performed using the light intensity or 'value' channel of the HSV color model or colorspace that corresponds to brightness. As such, the fusion formula may provide a new 'value' for the HSV color model for each pixel that is modified or changed. Moreover, as previously discussed, in some embodiments, the RGB color image may be converted to a CIE-Lab colorspace image. In this case, the L channel provides the brightness or light intensity values which are modified in the fusion formula.

In some embodiments, the fusion formula may comprise the following formula, where $I_{hybrid}$ comprises the new light intensity value in the converted colorspace (such as HSV or CIE-Lab):

$$I_{hybrid} = \acute{\alpha} \times I_{IR} + (1-\acute{\alpha}) \times I_{visible}$$

Where $\acute{\alpha}$ may comprise the following formula:

$$\acute{\alpha} \equiv \alpha \times \min\left(1, \frac{Ivisible}{t}\right)$$

In some embodiments, a may comprise an affine mixing factor and t may comprise the threshold for low light regions in the visible spectrum (e.g., color image) where the infrared intensity values from the infrared intensity image will be mixed in. $I_{IR}$ may comprise the infrared intensity of a corresponding pixel as indicated by the infrared intensity image and $I_{visible}$ may comprise the intensity or brightness channel of a pixel of the color image after being converted to a color model or colorspace with an intensity channel (such as V in HSV or L in CIE-Lab). As such, the results of the fusion formula ($I_{hybrid}$) may be used as the new channel value (e.g., corresponding to brightness or light intensity) for the converted colorspace image. In some embodiments, $I_{hybrid}$ may comprise a weighted intensity of the intensity value from the infrared intensity image and the intensity from the visible color or RGB spectrum. Moreover, as indicated in the formulas above comprising the min function, the value of t may provide a threshold value for which low light regions or pixels in the color image may not be modified with a mixing in of the infrared intensity image as such pixels may comprise values that are too dark to be 'relit' with the illumination correction of the fusion formula. As such, certain pixels of the color image will not have the corresponding 'value' or intensity (e.g., brightness) of the transformed colorspace image modified or changed if the pixel's value is beyond the threshold value.

An alternative fusion formula may comprise the following formula, where $I_{hybrid}$ comprises the new light intensity or brightness value:

$$I_{hybrid} = (I_{visible} - T_{dark}) I_R^{(1-1 \times \alpha)} + T_{dark}$$

In some embodiments, $I_{visible}$ may comprise the intensity or brightness channel of a pixel of the color image after being converted to a color model or colorspace with an intensity channel (such as V in HSV or L in CIE-Lab). $T_{dark}$ comprises a threshold for determining if a particular pixel comprises a visible that is too dark to be relit or modified by the fusion formula, and α may comprise a parameter for controlling how the value of the infrared intensity of a pixel will be used in the fusion formula. $I_{IR}$ may comprise the infrared intensity of a corresponding pixel of the infrared intensity image. Further details with regard to the application of the fusion formula to individual pixels are described with relation to FIG. 12.

As seen in FIG. 11, at block 1170, the colorspace image that has been modified by the fusion formula may be converted back to an RGB color image. The colorspace image may comprise an image in which a channel corresponding to brightness has been modified in accordance with the fusion formula. For example, the HSV colorspace image with a modified or changed 'V' channel for certain pixels may be converted to the RGB color image. In another example, the CIE-Lab colorspace image with a modified or changed 'L' channel for certain pixels may be converted to the RGB color image. In some embodiments, a conversion from the CIE-Lab colorspace image to the RGB color image may comprise converting the CIE-Lab colorspace image to an XYZ intermediate space and then from the XYZ intermediate space to the RGB color image. The conversion may be performed on a per pixel basis.

Figure 12:
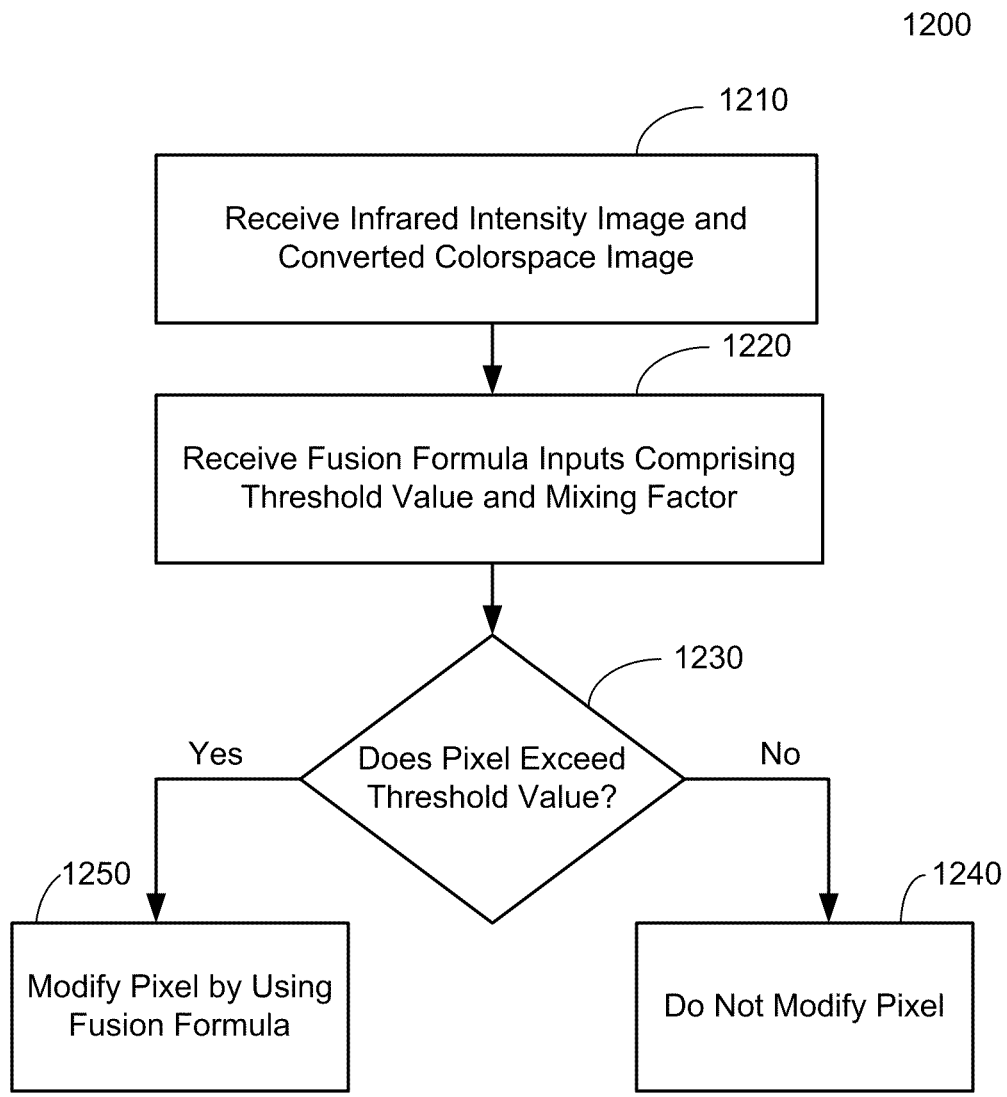
FIG. 12 illustrates a flow diagram of a method for modifying or changing a value of a pixel with a fusion formula in accordance with some embodiments.

FIG. 12 illustrates a flow diagram of a method 1200 for modifying or changing a value of a pixel with a fusion formula. In general, the method 1200 applies a fusion formula to change a channel value of a pixel of a colorspace image if the channel value of the pixel exceeds a threshold value.

As seen in FIG. 12, at block 1210, an infrared intensity image and a converted colorspace image is received. In some embodiments, the infrared intensity image may comprise an infrared intensity image that has been transformed to match the viewpoint of a corresponding color image, as previously discussed. As such, a transformed infrared intensity image may be received. Moreover, in some embodiments, the converted colorspace image may comprise an HSV colorspace image or a CIE-Lab colorspace image. For example, an RGB color image may be converted to the HSV colorspace or the CIE-Lab colorspace.

At block 1220, fusion formula inputs may be received. For example, a threshold value and a mixing factor may be received. In some embodiments, the threshold value may comprise the t or $T_{dark}$ variables as previously discussed with the fusion formulas for the HSV colorspace image and the CIE-Lab colorspace image. In the same or alternative embodiments, the mixing factor may comprise the variable a as discussed with the fusion formulas for the HSV colorspace image and the CIE-Lab colorspace image.

In some embodiments, a user may provide the fusion formula inputs. In some embodiments, the fusion formula inputs may comprise preset numbers. The fusion formula inputs may comprise an affine mixing factor (e.g., controlling how strongly the infrared intensity image may be mixed in) and/or a threshold value. In some embodiments, the threshold value may indicate a threshold for low light regions in a visible spectrum where infrared intensity values may be mixed into a channel of the HSV or CIE-Lab colorspace with the fusion formula. In some embodiments, a typical affine mixing factor may comprise a value of 0.30 and a typical low light threshold value may comprise a number $\frac{1}{5}^{th}$ of a display's dynamic range. For example, if the display's dynamic range comprises a value of 1000, then a typical light threshold value may comprise a value of 200 (e.g., 1000/5).

At block 1230, a determination is made whether a particular pixel channel value exceeds the threshold value or a brightness threshold value. For example, the determination may be made whether a channel value corresponding to brightness of each pixel exceeds or does not exceed a threshold brightness value. In some embodiments, if a pixel's brightness channel value (e.g., the 'V' channel for an HSV colorspace or the 'L' channel for a CIE-Lab colorspace) does not exceed the threshold value, then at block 1240, the channel value corresponding to brightness of the pixel is not modified. As such, the pixel is not modified by the fusion formula. However, if the pixel's brightness channel value does exceed the threshold value, then at block 1250, the channel value corresponding to brightness of the pixel is modified. As such, the pixel is modified by the fusion formula. In some embodiments, the pixel may be modified if the pixel brightness channel value is below the threshold value and the pixel may not be modified if the pixel brightness value is above the threshold value.

As such, in some embodiments, each pixel of an image may be evaluated against a threshold value. If a value of the pixel exceeds the threshold value, a fusion formula may be applied to the pixel to modify or change a value of the pixel. The fusion formula may be based on a mixing factor, a particular channel value of the pixel, and an infrared intensity value of a corresponding pixel of an infrared intensity image.

The illumination correction systems and methods disclosed herein may provide illumination correction to an entire image or a subset of the image. For example, the user extraction method as discussed with relation to FIGS. 4, 5, and 6 may be used to identify pixels that correspond to a user and pixels that correspond to a foreground. As such, the illumination correction of pixels only belonging to the user may be performed. In some embodiments, a plurality of users may be identified. As such, any number of the identified users may comprise pixels that have undergone illumination correction. However, if no user extraction is performed, then illumination correction of the entire scene (e.g., the user and the foreground) may be performed. Moreover, in some embodiments, a specific predefined area may be selected and pixels within the predefined may be modified with the fusion formula to provide illumination correction. As such, pixels that correspond to clothing, faces, specific people, or advertised objects may undergo the illumination correction methods. Additionally, since a depth image of a scene may be received, depth values of pixels may be used to selectively relight or correct the illumination of pixels at a defined depth value. For example, a predefined depth value of 3 feet may be provided, resulting in pixels that are at a depth of 3 feet or less to undergo illumination correction while pixels that are at a depth value exceeding 3 feet may not undergo illumination correction.

Figure 13:
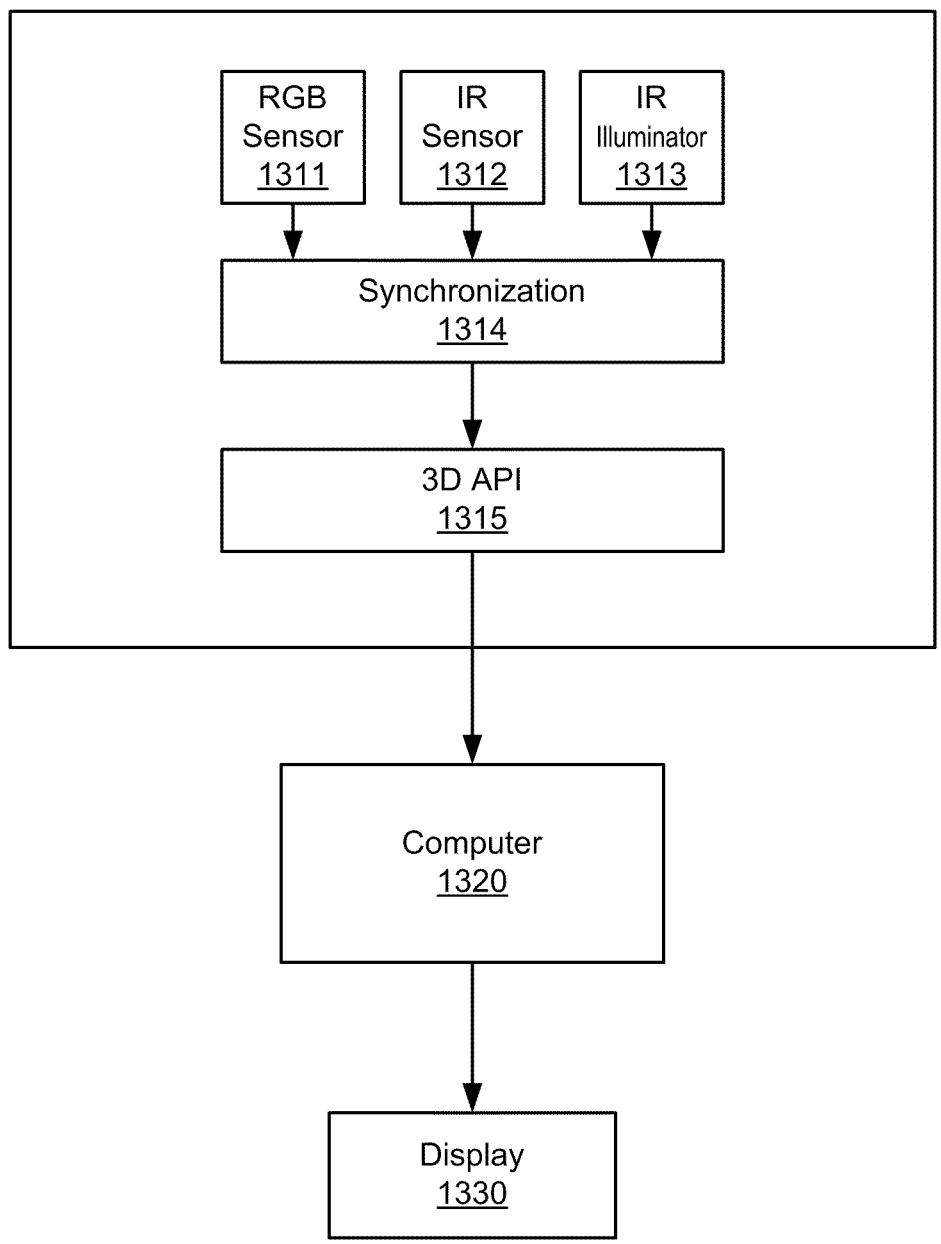
FIG. 13 illustrates an embodiment of a camera system for illumination correction in accordance with some embodiments.

FIG. 13 illustrates an embodiment of a camera system 1300 for the illumination correction systems and methods of the present invention. In general, the camera system 1300 comprises a camera 1310, computer 1320, and display 1330.

As seen in FIG. 13, a camera 1310 is connected to a computer 1320. The camera system 1300 may comprise a three dimensional (3D) camera, depth camera, z-camera, range camera. In some embodiments, the camera system 1300 may be comprised of a color or RGB camera and a depth camera or may comprise of a single camera with an RGB sensor and depth sensor. As such, the camera system 1300 receives color information and depth information. The received color information may comprise information related to the color of each pixel of a video. In some embodiments, the color information is received from a Red-Green-Blue (RGB) sensor 1311. As such, the RGB sensor 1311 may capture the color pixel information in a scene of a captured video image. The camera system 1300 may further comprise an infrared sensor 1312 and an infrared illuminator 1313. In some embodiments, the infrared illuminator 1313 may shine an infrared light through a lens of the camera system 1300 onto a scene. As the scene is illuminated by the infrared light, the infrared light will bounce or reflect back to the camera system 1300. The reflected infrared light is received by the infrared sensor 1312. The reflected light received by the infrared sensor results in depth information of the scene of the camera system 1300. As such, objects within the scene or view of the camera system 1300 may be illuminated by infrared light from the infrared illuminator 1313. The infrared light will reflect off of objects within the scene or view of the camera system 1300 and the reflected infrared light will be directed towards the camera system 1300. The infrared sensor 1312 may receive the reflected infrared light and determine a depth or distance of the objects within the scene or view of the camera 1200 based on the reflected infrared light.

In some embodiments, the camera system 1300 may further comprise a synchronization module 1314 to temporally synchronize the information from the RGB sensor 1311, infrared sensor 1312, and infrared illuminator 1313. The synchronization module 1314 may be hardware and/or software embedded into the camera system 1300. In some embodiments, the camera system 1300 may further comprise a 3D application programming interface (API) 1315 for providing an input-output (IO) structure and interface to communicate the color and depth information to a computer system 1320. The computer system 1320 may process the received color, infrared intensity, and depth information and comprise and perform the systems and methods disclosed herein. In some embodiments, the computer system 1320 may display the illumination corrected image onto a display screen 1330.

Figure 14:
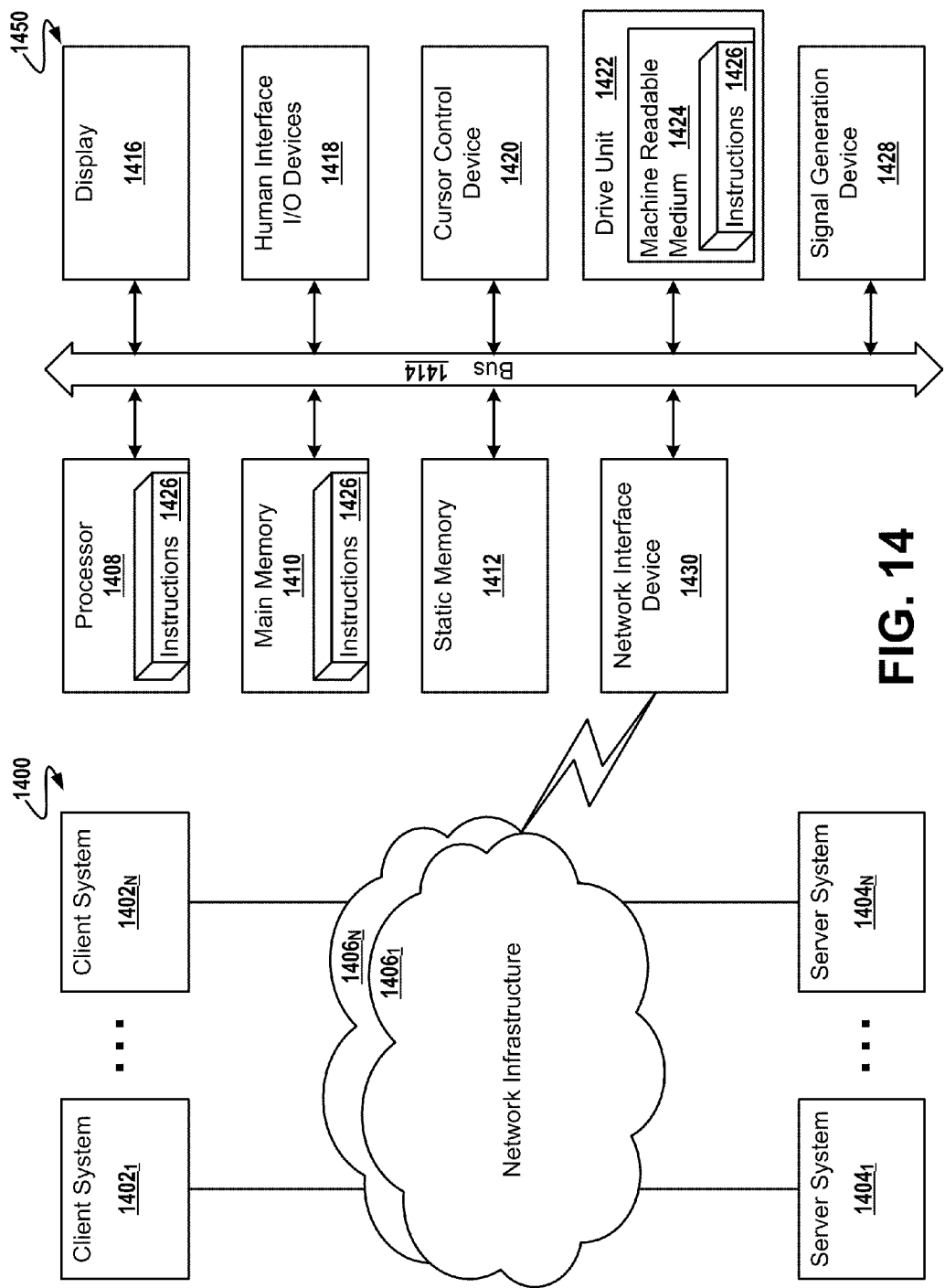
FIG. 14 illustrates an embodiment of a computer system and network system that incorporates the illumination correction systems and methods of the present invention.

FIG. 14 is a diagrammatic representation of a network 1400, including nodes for client computer systems 1302$_1$ through 1302$_N$, nodes for server computer systems 1404$_1$ through 1404$_N$, nodes for network infrastructure 1406$_1$ through 1406$_N$, any of which nodes may comprise a machine 1450 within which a set of instructions for causing the machine to perform any one of the techniques discussed above may be executed. The embodiment shown is purely exemplary, and might be implemented in the context of one or more of the figures herein.

Any node of the network 1400 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc.).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 1450 includes a processor 1408 (e.g. a processor core, a microprocessor, a computing device, etc.), a main memory 1410 and a static memory 1412, which communicate with each other via a bus 1414. The machine 1450 may further include a display unit 1416 that may comprise a touch-screen, or a liquid crystal display (LCD), or a light emitting diode (LED) display, or a cathode ray tube (CRT). As shown, the computer system 1450 also includes a human input/output (I/O) device 1418 (e.g. a keyboard, an alphanumeric keypad, etc.), a pointing device 1420 (e.g. a mouse, a touch screen, etc), a drive unit 1422 (e.g. a disk drive unit, a CD/DVD drive, a tangible computer readable removable media drive, an SSD storage device, etc.), a signal generation device 1428 (e.g. a speaker, an audio output, etc.), and a network interface device 1430 (e.g. an Ethernet interface, a wired network interface, a wireless network interface, a propagated signal interface, etc.).

The drive unit 1422 includes a machine-readable medium 1424 on which is stored a set of instructions (i.e. software, firmware, middleware, etc.) 1426 embodying any one, or all, of the methodologies described above. The set of instructions 1426 is also shown to reside, completely or at least partially, within the main memory 1410 and/or within the processor 1408. The set of instructions 1426 may further be transmitted or received via the network interface device 1430 over the network bus 1414.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

Although the present invention has been described in terms of specific exemplary embodiments, it will be appreciated that various modifications and alterations might be made by those skilled in the art without departing from the spirit and scope of the invention. The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. A method for illumination correction of an image, the method comprising:
    receiving, using a computer, a color image, a depth image and an infrared intensity image;
    converting the color image to a colorspace image comprising a brightness channel corresponding to a brightness value for each pixel;
    based at least in part on the depth image, identifying pixels in the colorspace image that correspond to a user;
    comparing, for each pixel of the colorspace image corresponding to the user, the brightness value of the pixel to a brightness threshold value; and
    creating a hybrid intensity image of the user by using a fusion formula based on the brightness value of a pixel of the colorspace image corresponding to the user and an infrared intensity value of a corresponding pixel of the infrared intensity image by applying the fusion formula to each pixel with a brightness value greater than the brightness threshold value, and by using the brightness channel for each pixel with a brightness value lower than the brightness threshold value.

2. The method as set forth in claim 1, wherein the use of the fusion formula comprises modifying the brightness channel value of a pixel of the colorspace image based on the infrared intensity value of the corresponding pixel of the infrared intensity image.

3. The method as set forth in claim 1, wherein the color image comprises an RGB color image, the colorspace image comprises a CIE-Lab colorspace image, the channel corresponding to the brightness value comprises the luminance (L) channel of the CIE-Lab colorspace image.

4. The method as set forth in claim 1, wherein the color image comprises an RGB color image, the colorspace image comprises a Hue-Saturation-Value (HSV) colorspace image, the channel corresponding to the brightness value comprises the value (V) channel of the HSV colorspace image.

5. The method as set forth in claim 1, further comprising transforming the infrared intensity image to match a viewpoint of the color image based on a displacement between an infrared sensor generating the infrared intensity image and a color sensor generating the color image.

6. The method as set forth in claim 1, further comprising applying a brightness adjustment and a contrast adjustment of a camera generating the color image, the adjustments are performed until a mean sample value of the brightness value of the colorspace image approximates a target mean sample value.

7. The method as set forth in claim 1, further comprising shining an infrared light onto a user, the infrared intensity image comprises the infrared light that is shined onto the user and returned to an infrared sensor.

8. A system, comprising at least one processor and memory, for illumination correction of an image, the system comprising:
    a module for receiving a color image, a depth image and an infrared intensity image;
    a module for converting the color image to a colorspace image comprising a brightness channel corresponding to a brightness value for each pixel;
    based at least in part on the depth image, identifying pixels in the colorspace image that correspond to a user;
    a module for comparing, for each pixel of the colorspace image corresponding to the user, the brightness value of the pixel to a brightness threshold value; and
    a module for creating a hybrid intensity image of the user by using a fusion formula based on the brightness value of a pixel of the colorspace image corresponding to the user and an infrared intensity value of a corresponding pixel of the infrared intensity image by applying the fusion formula to each pixel with a brightness value greater than the brightness threshold value, and by using the brightness channel for each pixel with a brightness value lower than the brightness threshold value.

9. The system as set forth in claim 8, wherein the use of the fusion formula comprises modifying the brightness channel value of a pixel of the colorspace image based on the infrared intensity value of the corresponding pixel of the infrared intensity image.

10. The system as set forth in claim 8, wherein the color image comprises an RGB color image, the colorspace image comprises a CIE-Lab colorspace image, the channel corresponding to the brightness value comprises the luminance (L) channel of the CIE-Lab colorspace image.

11. The system as set forth in claim 8, wherein the color image comprises an RGB color image, the colorspace image comprises a Hue-Saturation-Value (HSV) colorspace image, the channel corresponding to the brightness value comprises the value (V) channel of the HSV colorspace image.

12. The system as set forth in claim 8, further comprising a module for transforming the infrared intensity image to match a viewpoint of the color image based on a displacement between an infrared sensor generating the infrared intensity image and a color sensor generating the color image.

13. The system as set forth in claim 8, further comprising a module for applying a brightness adjustment and a contrast adjustment of a camera generating the color image, the adjustments are performed until a mean sample value of the brightness value of the colorspace image approximates a target mean sample value.

14. The system as set forth in claim 8, further comprising a module for shining an infrared light onto a user, the infrared intensity image comprises the infrared light that is shined onto the user and returned to an infrared sensor.

15. A non-transitory computer readable medium carrying one or more instructions for illumination correction of an image, wherein the one or more instructions, when executed by one or more processors, causes the one or more processors to perform the steps of:
receiving a color image, a depth image, and an infrared intensity image;
converting the color image to a colorspace image comprising a brightness channel corresponding to a brightness value for each pixel;
based at least in part on the depth image, identifying pixels in the colorspace image that correspond to a user;
comparing, for each pixel of the colorspace image corresponding to the user, the brightness value of the pixel to a brightness threshold value; and
creating a hybrid intensity image of the user by modifying the brightness channel using a fusion formula based on the brightness value of a pixel of the colorspace image corresponding to the user and an infrared intensity value of a corresponding pixel of the infrared intensity image by applying the fusion formula to each pixel with a brightness value greater than the brightness threshold value, and by using the brightness channel for each pixel with a brightness value lower than the brightness threshold value.

16. The non-transitory computer readable medium as set forth in claim 15, wherein the use of the fusion formula comprises modifying the brightness channel value of a pixel of the colorspace image based on the infrared intensity value of the corresponding pixel of the infrared intensity image.

17. The non-transitory computer readable medium as set forth in claim 15, wherein the color image comprises an RGB color image, the colorspace image comprises a CIE-Lab colorspace image, the channel corresponding to the brightness value comprises the luminance (L) channel of the CIE-Lab colorspace image.

18. The non-transitory computer readable medium as set forth in claim 15, wherein the color image comprises an RGB color image, the colorspace image comprises a Hue-Saturation-Value (HSV) colorspace image, the channel corresponding to the brightness value comprises the value (V) channel of the HSV colorspace image.

19. The non-transitory computer readable medium as set forth in claim 15, wherein the steps further comprise transforming the infrared intensity image to match a viewpoint of the color image based on a displacement between an infrared sensor generating the infrared intensity image and a color sensor generating the color image.

20. The non-transitory computer readable medium as set forth in claim 15, wherein the steps further comprise applying a brightness adjustment and a contrast adjustment of a camera generating the color image, the adjustments are performed until a mean sample value of the brightness value of the colorspace image approximates a target mean sample value.

\* \* \* \* \*